United States Patent
Xia et al.

(10) Patent No.: US 11,239,970 B2
(45) Date of Patent: Feb. 1, 2022

(54) REFERENCE SIGNAL SENDING METHOD, REFERENCE SIGNAL RECEIVING METHOD, AND COMMUNICATIONS APPARATUS

(71) Applicant: Huawei Technologies Co., Ltd., Shenzhen (CN)

(72) Inventors: Jinhuan Xia, Beijing (CN); Yongxia Lyu, Ottawa (CA); Yongping Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 221 days.

(21) Appl. No.: 16/712,566

(22) Filed: Dec. 12, 2019

(65) Prior Publication Data

US 2020/0119881 A1    Apr. 16, 2020

Related U.S. Application Data

(63) Continuation of application No. PCT/CN2018/091447, filed on Jun. 15, 2018.

(30) Foreign Application Priority Data

Jun. 16, 2017   (CN) .......................... 201710459603.1
Sep. 29, 2017   (CN) .......................... 201710910063.4

(51) Int. Cl.
*H04L 5/00*      (2006.01)
*H04W 72/04*   (2009.01)

(52) U.S. Cl.
CPC .......... *H04L 5/0051* (2013.01); *H04L 5/0007* (2013.01); *H04W 72/042* (2013.01)

(58) Field of Classification Search
None
See application file for complete search history.

(56) References Cited

U.S. PATENT DOCUMENTS

2015/0063236 A1*  3/2015  Seo .......................... H04L 5/00
                                                            370/329
2017/0223687 A1*  8/2017  Kuchibhotla ......... H04L 5/0094
(Continued)

FOREIGN PATENT DOCUMENTS

CN        102711253 A    10/2012
CN        103702430 A     4/2014
(Continued)

OTHER PUBLICATIONS

Hitachi Ltd, "Performance Evaluation of DMRS for NCT," 3GPP TSG-RAN WG1 Meeting #72bis, R1-131148, Chicago, IL, USA, Apr. 15-29, 2013, 6 pages.
(Continued)

*Primary Examiner* — Duc T Duong
(74) *Attorney, Agent, or Firm* — Slater Matsil, LLP

(57) ABSTRACT

This application provides a reference signal sending method. The method includes: determining a resource set, where the resource set is used to carry a demodulation reference signal and downlink information, the downlink information is downlink control information or downlink data, the demodulation reference signal is used to demodulate the downlink information, the resource set includes a first time-frequency resource group and a second time-frequency resource group, the first time-frequency resource group is reserved time-frequency resources, and the second time-frequency resource group is used to carry the demodulation reference signal; determining a third time-frequency resource group based on a location of the second time-frequency resource group and an offset when the first time-frequency resource group and the second time-frequency resource group overlap, wherein the offset is determined according to a preset rule; and sending the demodu-
(Continued)

lation reference signal by using the third time-frequency resource group.

19 Claims, 9 Drawing Sheets

(56) References Cited

U.S. PATENT DOCUMENTS

| | | | | |
|---|---|---|---|---|
| 2018/0206247 | A1* | 7/2018 | Sun | H04W 72/085 |
| 2018/0279289 | A1* | 9/2018 | Islam | H04W 72/0446 |
| 2018/0287734 | A1* | 10/2018 | Lee | H04L 1/0067 |
| 2018/0295590 | A1* | 10/2018 | Abedini | H04L 5/0051 |
| 2018/0324770 | A1* | 11/2018 | Nogami | H04L 5/005 |
| 2018/0359057 | A1* | 12/2018 | Yang | H04L 5/00 |

FOREIGN PATENT DOCUMENTS

| | | |
|---|---|---|
| CN | 103841649 A | 6/2014 |
| CN | 106793146 A | 5/2017 |
| JP | 2019529408 A | 10/2019 |
| WO | 2016165118 A1 | 10/2016 |

OTHER PUBLICATIONS

3rd Generation Partnership Project; Technical Specification Group Radio Access Network; NR; Physical channels and modulation (Release 15), 3GPP TS 38.211 V0.0.0 (May 2017),10 pages.

Huawei et al., "PSS/SSS and DMRS collision and NCT identification," 3GPP TSG RAN WG1 Meeting #71, R1-125158, New Orleans, LA,USA, Nov. 12-16, 2012, 4 pages.

ZTE, "DMRS design with v-shift enabled," 3GPP TSG RAN WG1 Meeting #57bis, R1-092473, Los Angeles, CA, USA, Jun. 29-Jul. 3, 2009, 4 pages.

Mitsubishi Electric, "Downlink Control Signaling for CoMP," 3GPP TSG RAN WG1 #68bis; R1-121721, Jeju, Korea, Mar. 26-30, 2012, 4 pages.

ITL, "Remaining details on DL DMRS for NR", 3GPP TSG RAN WG1 Meeting #90, R1-1716569, Nagoya, Japan, Sep. 18-21, 2017, 9 pages.

Spreadtrum Communications, "Considerations on DMRS for CP-OFDM", 3GPP TSG RAN WG1 #90, R1-1713052, Prague, Czech Rep., Aug. 21-25, 2017, 14 pages.

NTT Docomo, Inc., "Views on DM-RS", 3GPP TSG RAN WG1 Meeting #90, R1-1713923, Prague, Czech Rep., Aug. 21-28, 2017, 8 pages.

* cited by examiner

REFERENCE SIGNAL SENDING METHOD, REFERENCE SIGNAL RECEIVING METHOD, AND COMMUNICATIONS APPARATUS

CROSS-REFERENCE TO RELATED APPLICATIONS

This application is a continuation application of International application No. PCT/CN2018/091447, filed on Jun. 15, 2018, which claims priority to Chinese Patent Application No. 201710459603.1, filed on Jun. 16, 2017 and Chinese Patent Application No. 201710910063.4, filed on Sep. 29, 2017. The disclosures of the aforementioned applications are hereby incorporated by reference in their entireties.

TECHNICAL FIELD

This application relates to the communications field, and more specifically, to a reference signal sending method and apparatus, and a reference signal receiving method and apparatus.

BACKGROUND

Currently, reference signals have been widely applied. In a process of using a reference signal in a current technology, a transmit end device sends a demodulation reference signal while sending data, and a receive end device first performs channel estimation based on the demodulation reference signal, and further demodulates the data based on a result of the channel estimation.

In addition, in the current technology, a reference signal is mainly designed for a service of a relatively large data volume, for example, an evolved mobile broadband (eMBB) service, and a reliability requirement of such a service for data demodulation is relatively low (for example, 90%).

With development of communications technologies, a service with relatively high transmission reliability requirement (for example, 99.999%) emerges, for example, ultra-reliable and low latency communications (URLLC) service. The existing reference signal design cannot meet high-reliability transmission of a service.

Therefore, it is desired to provide a technology that can meet a reference signal requirement of a service that has different reliability requirements.

SUMMARY

This application provides a reference signal sending method and apparatus, and a reference signal receiving method and apparatus, to meet a configuration requirement for a reference signal of a service that has different reliability requirements.

According to a first aspect, a reference signal sending method is provided. The method includes: sending, by a network device, first indication information of configuration information to a terminal device, where the first indication information indicates first configuration information in at least two types of configuration information corresponding to a first demodulation reference signal, each of the at least two types of configuration information includes at least one of the following parameters: a sequence used by a demodulation reference signal, a density of a time-frequency resource that carries the demodulation reference signal in one time-frequency resource group, an antenna port associated with the demodulation reference signal, and a location of the time-frequency resource that carries the demodulation reference signal, and any two types of configuration information include at least one different parameter; and sending, by the network device, first downlink information and the first demodulation reference signal to the terminal device based on the first configuration information by using a first time-frequency resource group, where the first downlink information includes first downlink data or first downlink control information, and the first demodulation reference signal is used to demodulate the first downlink information.

According to a second aspect, a reference signal receiving method is provided. The method includes: receiving, by a terminal device, first indication information from a network device, where the first indication information indicates first configuration information in at least two types of configuration information corresponding to a first demodulation reference signal, each of the at least two types of configuration information includes at least one of the following parameters: a sequence used by a demodulation reference signal, a density of a time-frequency resource that carries the demodulation reference signal in one time-frequency resource group, an antenna port associated with the demodulation reference signal, and a location of the time-frequency resource that carries the demodulation reference signal, and any two types of configuration information include at least one different parameter; receiving, by the terminal device, first downlink information and the first demodulation reference signal from the network device based on the first configuration information by using a first time-frequency resource group, where the first downlink information includes first downlink data or first downlink control information; and demodulating, by the terminal device, the first downlink information based on the first demodulation reference signal.

In this embodiment of this application, the first indication information indicates the first configuration information in the at least two types of configuration information corresponding to the first demodulation reference signal, and any two types of configuration information include at least one different parameter, so that a reference signal used to demodulate data corresponds to a plurality of types of configuration information or a reference signal used to demodulate control information corresponds to a plurality of types of configuration information. In this way, in actual service transmission, the network device can select one of the plurality of types of configuration information that matches a reliability requirement of a current service to transmit a reference signal, to meet a configuration requirement for a demodulation reference signal of a service that has different reliability requirements.

Optionally, the first downlink information includes the first downlink control information, and the first configuration information is determined based on an information format of the first downlink control information and a first mapping relationship. The first mapping relationship is a mapping relationship between at least two types of information formats and the at least two types of configuration information.

Optionally, the first downlink information includes the first downlink control information, and determining, by the network device, the first configuration information in the at least two types of configuration information corresponding to the first demodulation reference signal includes: determining, by the network device, the first configuration information in the at least two types of configuration information based on an information format of the first downlink control information and a first mapping relationship, where the first mapping relationship is a mapping relationship between at least two types of information formats and the at least two types of configuration information.

According to the reference signal sending method in this embodiment of this application, a mapping relationship between a plurality of information formats and a plurality of types of configuration information is obtained in advance, so that the network device can select, based on an information format of control information that needs to be transmitted currently, configuration information that matches a currently transmitted service, thereby improving efficiency and implementability of determining configuration information.

Optionally, the first configuration information is determined based on a service type of a service corresponding to the first downlink information and a second mapping relationship, and the second mapping relationship is a mapping relationship between at least two service types and the at least two types of configuration information.

Optionally, determining, by the network device, the first configuration information in the at least two types of configuration information corresponding to the first demodulation reference signal includes: determining, by the network device, the first configuration information in the at least two types of configuration information based on a service type of a service corresponding to the first downlink information and a second mapping relationship, where the second mapping relationship is a mapping relationship between at least two service types and the at least two types of configuration information.

Optionally, the first downlink information includes the first downlink control information, and the first configuration information is determined based on a control channel format (or an aggregation level) of a downlink control channel that carries the first downlink control information and a third mapping relationship. The third mapping relationship is a mapping relationship between at least two types of control channel formats (or aggregation levels) and the at least two types of configuration information.

Optionally, the first downlink information includes the first downlink control information, and determining, by the network device, the first configuration information in the at least two types of configuration information corresponding to the first demodulation reference signal includes: determining, by the network device, the first configuration information in the at least two types of configuration information based on a control channel format (or an aggregation level) of a downlink control channel that carries the first downlink control information and a third mapping relationship, where the third mapping relationship is a mapping relationship between at least two types of control channel formats (or aggregation levels) and the at least two types of configuration information.

Optionally, the first time-frequency resource group belongs to a first resource set, the first downlink information includes the first downlink control information, and the first demodulation reference signal is further used to demodulate second downlink data, where the second downlink data is data sent by the network device by using a second resource set, and the second downlink data is data received by the terminal device from the network device by using the second resource set. The second resource set and the first resource set are consecutive in time domain, or an interval between the second resource set and the first resource set in time domain is less than or equal to a first threshold; and the second resource set and the first resource set are consecutive in frequency domain, or a spacing between the second resource set and the first resource set in frequency domain is less than or equal to a second threshold. Correspondingly, the method further includes: demodulating, by the terminal device, second downlink data based on the first demodulation reference signal.

Therefore, both control information and data can be demodulated based on a same reference signal, resource occupation of a reference signal can be reduced, and communication efficiency can be improved.

Optionally, the first demodulation reference signal is obtained after precoding processing is performed based on a first precoding matrix, and the method further includes: performing, by the network device, precoding processing on the second downlink data based on the first precoding matrix.

A same precoding matrix is used to perform precoding processing on data and control information that are demodulated by sharing a same reference signal. Therefore, complexity of precoding processing and complexity of a channel design can be reduced, so that a processing load of the network device can be reduced, and communication efficiency can be improved.

Optionally, the second downlink data is specifically sent by the network device by using a third time-frequency resource group in the second resource set, where the third time-frequency resource group and the first time-frequency resource group are consecutive in time domain, or an interval between the third time-frequency resource group and the first time-frequency resource group in time domain is less than or equal to a third threshold; and the third time-frequency resource group and the first time-frequency resource group are consecutive in frequency domain, or a spacing between the third time-frequency resource group and the first time-frequency resource group in frequency domain is less than or equal to a fourth threshold.

Optionally, the first time-frequency resource group belongs to a first resource set, the first resource set includes at least two time-frequency resource groups, the first downlink information includes the first downlink control information, and the method further includes: sending, by the network device, a second demodulation reference signal and third downlink data to the terminal device by using a second time-frequency resource group in the first resource set, where the second demodulation reference signal is used to demodulate the third downlink data.

Correspondingly, the method further includes: receiving, by the terminal device, the second demodulation reference signal and the third downlink data from the network device by using the second time-frequency resource group in the first resource set; and demodulating, by the terminal device, the third downlink data based on the second demodulation reference signal.

A same resource set is used to send control information and downlink data, so that resource utilization efficiency can be improved, thereby improving communication efficiency.

Optionally, the receiving, by the terminal device, the second demodulation reference signal and the third downlink data from the network device by using the second time-frequency resource group in the first resource set includes: receiving, by the terminal device, the second demodulation reference signal from the network device by using the second time-frequency resource group in the first resource set based on the first configuration information; or receiving, by the terminal device, the second demodulation reference signal from the network device by using the second time-frequency resource group in the first resource set based on second configuration information in the at least two types of configuration information corresponding to the second demodulation reference signal.

Optionally, configuration information of the second demodulation reference signal in the second time-frequency resource group is the first configuration information.

Optionally, configuration information of the second demodulation reference signal in the second time-frequency resource group is the second configuration information in the at least two types of configuration information corresponding to the second demodulation reference signal.

Optionally, the network device sends the first indication information to the terminal device, and correspondingly, the terminal device receives the first indication information from the network side device. The first indication information indicates the configuration information used by the second demodulation reference signal in the second time-frequency resource group.

Optionally, the at least two types of configuration information corresponding to the first demodulation reference signal further include fifth configuration information, a first density is less than a second density, and first locations are some of second locations. The first density is a density, included in the first configuration information, of a time-frequency resource that carries a reference signal in one time-frequency resource group. The second density is a density, included in the fifth configuration information, of a time-frequency resource that carries a reference signal in one time-frequency resource group. The first location is a location, included in the first configuration information, of a time-frequency resource that carries a reference signal. The second location is a location, included in the fifth configuration information, of a time-frequency resource that carries a reference signal.

Optionally, time-frequency resources corresponding to the first locations are a subset of time-frequency resources corresponding to the second locations.

Optionally, a quantity of elements included in an intersection set of time-frequency resources corresponding to the first locations and time-frequency resources corresponding to the second locations is not 0.

Optionally, the at least two types of configuration information corresponding to the first demodulation reference signal are in a one-to-one correspondence with at least two types of densities, and the at least two types of configuration information corresponding to the first demodulation reference signal are in a one-to-one correspondence with at least two types of locations. A density corresponding to third configuration information in the at least two types of configuration information corresponding to the first demodulation reference signal is less than a density corresponding to fourth configuration information in the at least two types of configuration information corresponding to the first demodulation reference signal, and at least some of locations corresponding to the third configuration information belong to locations corresponding to the fourth configuration information.

The "density corresponding to configuration information" is the "density of a time-frequency resource that carries a demodulation reference signal in one time-frequency resource group" included (in other words, indicated) in the configuration information.

The "location corresponding to configuration information" is the "location of the time-frequency resource that carries the demodulation reference signal" included (in other words, indicated) in the configuration information.

Optionally, the first configuration information is the third configuration information or the fourth configuration information.

Optionally, the method further includes: sending, by the network device, second indication information to the terminal device, where the second indication information indicates that the first demodulation reference signal is used to demodulate the second downlink data.

Correspondingly, the demodulating, by the terminal device, second downlink data based on the first demodulation reference signal includes: receiving, by the terminal device, second indication information from the network device, where the second indication information indicates that the first demodulation reference signal is used to demodulate the second downlink data; and demodulating, by the terminal device, the second downlink data by using the first demodulation reference signal according to the second indication information.

The network device instructs the terminal device to demodulate downlink control information and downlink data by using a same demodulation reference signal, thereby reducing a processing load of the terminal device and improving communication reliability.

Optionally, the first time-frequency resource group belongs to a first resource set, the first downlink information includes the first downlink control information, the first resource set further includes a fourth time-frequency resource group, the fourth time-frequency resource group is used to carry a third demodulation reference signal, the third demodulation reference signal is used to demodulate fourth downlink data, and the fourth downlink data is carried in a third resource set.

Demodulation reference signals of control information and downlink data that are carried in different resource sets are sent in a same resource set, to send the demodulation reference signals together, so that processing efficiency of the network device and processing efficiency of the terminal device are improved.

Optionally, the method further includes: determining, by the network device, a fifth time-frequency resource group based on a location of the fourth time-frequency resource group and a preset offset when the fourth time-frequency resource group and a first time-frequency resource in the first time-frequency resource group overlap; and sending, by the network device, the third demodulation reference signal by using the fifth time-frequency resource group, where the first time-frequency resource is a time-frequency resource that is in the first time-frequency resource group and that is used to carry the first demodulation reference signal.

Correspondingly, the method further includes: determining, by the terminal device, the fifth time-frequency resource group based on the location of the fourth time-frequency resource group and the preset offset when the fourth time-frequency resource group and the first time-frequency resource in the first time-frequency resource group overlap; and receiving, by the terminal device, the third demodulation reference signal from the network device by using the fifth time-frequency resource group, where the first time-frequency resource is a time-frequency resource that is in the first time-frequency resource group and that is used to carry the first demodulation reference signal.

Optionally, the fifth time-frequency resource group includes at least one second time-frequency resource and at least one third time-frequency resource, the second time-frequency resource is a time-frequency resource that is in the fourth time-frequency resource group and that does not overlap with the first time-frequency resource, and the third time-frequency resource is a time-frequency resource obtained after a time-frequency resource that is in the fourth time-frequency resource group and that overlaps with the first time-frequency resource is offset by the preset offset, or a time-frequency resource in the fifth time-frequency resource group is a time-frequency resource obtained after each time-frequency resource in the fourth time-frequency resource group is offset by the preset offset.

When a resource that carries a demodulation reference signal used to demodulate control information overlaps with a resource that carries a demodulation reference signal used to demodulate downlink data, the resource used to carry the demodulation reference signal of the downlink data is offset based on a specified offset, so that demodulation reference signals of both control information and downlink data can be reliably sent, thereby improving communication reliability.

Optionally, the offset includes an offset in time domain.

Optionally, the offsetting based on the offset includes offsetting backward by one or more symbols in time domain.

Optionally, the offset includes an offset in frequency domain.

Optionally, the offsetting based on the offset includes offsetting by one or more REs in a high-frequency direction or a low-frequency direction in frequency domain.

Optionally, the method further includes: sending, by the network device, third indication information to the terminal device, where the third indication information indicates that the fourth downlink data is demodulated by using the third demodulation reference signal.

Correspondingly, the method further includes: receiving, by the terminal device, the third indication information from the network device, where the third indication information indicates that the fourth downlink data is demodulated by using the third demodulation reference signal; and demodulating, by the terminal device, the fourth downlink data according to the third indication information by using the third demodulation reference signal.

Optionally, the "preset offset" may mean that the offset may be determined according to a preset rule.

Optionally, the "preset offset" may mean that the offset may be configured and indicated by the network device to the terminal device.

The network device may semi-statically indicate the preset offset by using higher layer signaling (such as SIB or RRC signaling).

Alternatively, the network device may dynamically indicate the preset offset by using physical layer signaling (such as downlink control information (DCI)).

According to a third aspect, a reference signal sending method is provided. The method includes: sending, by a network device, downlink control information and a demodulation reference signal to a terminal device by using a first resource set, where the demodulation reference signal is used to demodulate the downlink control information; and sending, by the network device, downlink data to the terminal device by using a second resource set, where the demodulation reference signal is further used to demodulate the downlink data.

According to a fourth aspect, a reference signal receiving method is provided. The method includes: receiving, by a terminal device, downlink control information and a demodulation reference signal from a network device by using a first resource set; receiving, by the terminal device, second downlink data from the network device by using a second resource set; and demodulating, by the terminal device, the downlink control information and the downlink data based on the first demodulation reference signal.

Optionally, the second resource set and the first resource set are consecutive in time domain, or an interval between the second resource set and the first resource set in time domain is less than or equal to a first threshold; and the second resource set and the first resource set are consecutive in frequency domain, or a spacing between the second resource set and the first resource set in frequency domain is less than or equal to a second threshold.

According to the reference signal sending method in this embodiment of this application, both control information and data can be demodulated based on a same reference signal. Therefore, resource occupation of a reference signal can be reduced, and communication efficiency can be improved.

Optionally, a precoding matrix used for precoding processing of the downlink data is the same as a precoding matrix used for precoding processing of the demodulation reference signal (or the downlink control information).

A same precoding matrix is used to perform precoding processing on data and control information that are demodulated by sharing a same reference signal. Therefore, complexity of precoding processing and complexity of a channel design can be reduced, so that a processing load of the network device can be reduced, and communication efficiency can be improved.

According to a fifth aspect, a reference signal sending method is provided. The method includes: determining, by a network device, a resource set, where the resource set is used to carry a demodulation reference signal and downlink information, the downlink information is downlink control information or downlink data, the demodulation reference signal is used to demodulate the downlink information, the resource set includes a first time-frequency resource group and a second time-frequency resource group, the first time-frequency resource group is reserved time-frequency resources, and the second time-frequency resource group is used to carry the demodulation reference signal; determining, by the network device, a third time-frequency resource group based on a location of the second time-frequency resource group and a preset offset when the first time-frequency resource group and the second time-frequency resource group overlap; and sending, by the network device, the demodulation reference signal by using the third time-frequency resource group.

According to a sixth aspect, a reference signal receiving method is provided. The method includes: determining, by a terminal device, a resource set, where the resource set is used to carry a demodulation reference signal and downlink information, the downlink information is downlink control information or downlink data, the demodulation reference signal is used to demodulate the downlink information, the resource set includes a first time-frequency resource group and a second time-frequency resource group, the first time-frequency resource group is reserved time-frequency resources, and the second time-frequency resource group is used to carry the demodulation reference signal; determining, by the terminal device, a third time-frequency resource group based on a location of the second time-frequency resource group and a preset offset when the first time-frequency resource group and the second time-frequency resource group overlap; and receiving, by the terminal device, the demodulation reference signal by using the third time-frequency resource group.

When a resource that carriers a demodulation reference signal used to demodulate downlink information overlaps with a reserved resource, the resource used to carry a demodulation reference signal of downlink information is offset based on a specified offset, so that a demodulation reference signal can be reliably sent, and communication reliability is further improved.

Optionally, before the determining, by the network device, a third time-frequency resource group based on a location of the second time-frequency resource group and a preset offset, the method further includes: sending, by the network device, indication information to the terminal device, where the indication information indicates that the first time-frequency resource group is reserved time-frequency resources.

Correspondingly, the determining, by the terminal device, a third time-frequency resource group based on a location of the second time-frequency resource group and a preset offset when the first time-frequency resource group and the second time-frequency resource group overlap includes: receiving, by the terminal device, the indication information from the network device, where the indication information indicates that the first time-frequency resource group is reserved time-frequency resources; and after the terminal device determines, based on the indication information, that the first time-frequency resource group is a reserved time-frequency resource, when the first time-frequency resource group and the second time-frequency resource group overlap, determining, by the terminal device, the third time-frequency resource group based on the location of the second time-frequency resource group and the preset offset.

Optionally, the reserved time-frequency resources may be time-frequency resources that are determined by the terminal device as resources that do not carry reference signals.

Optionally, the reserved time-frequency resources may be time-frequency resources that are not used by the network device for sending or receiving.

Optionally, the "preset offset" may mean that the offset may be determined according to a preset rule.

Optionally, the "preset offset" may mean that the offset may be configured and indicated by the network device to the terminal device.

The network device may semi-statically indicate the preset offset by using higher layer signaling (such as SIB or RRC signaling).

Alternatively, the network device may dynamically indicate the preset offset by using physical layer signaling (such as downlink control information (DCI)).

With reference to the foregoing aspects and the foregoing implementations of the aspects, in another implementation, a resource set includes a plurality of control channel elements (CCEs). Each control channel element includes at least one resource element group (REG) or physical resource block (PRB).

With reference to the foregoing aspects and the foregoing implementations of the aspects, in another implementation, one resource set includes a plurality of resource element groups REGs.

With reference to the foregoing aspects and the foregoing implementations of the aspects, in another implementation, one resource set includes a plurality of physical resource blocks (PRBs).

With reference to the foregoing aspects and the foregoing implementations of the aspects, in another implementation, one time-frequency resource group is one or more resource element groups (REGs).

With reference to the foregoing aspects and the foregoing implementations of the aspects, in another implementation, the first resource set is a control resource set CORESET.

With reference to the foregoing aspects and the foregoing implementations of the aspects, in another implementation, the first resource set occupies at least one physical resource block PRB group.

With reference to the foregoing aspects and the foregoing implementations of the aspects, in another implementation, the first resource set and the second resource set belong to a same PRB group.

With reference to the foregoing aspects and the foregoing implementations of the aspects, in another implementation, a PRB group occupied by the first resource set and a PRB group occupied by the second resource set are consecutive in frequency domain. For example, the PRB group occupied by the first resource set and the PRB group occupied by the second resource set are adjacent or overlap in frequency domain.

With reference to the foregoing aspects and the foregoing implementations of the aspects, in another implementation, a spacing in frequency domain between a PRB group occupied by the first resource set and a PRB group occupied by the second resource set is less than or equal to a preset frequency domain threshold.

With reference to the foregoing aspects and the foregoing implementations of the aspects, in another implementation, a PRB group occupied by the first resource set and a PRB group occupied by the second resource set are consecutive in time domain. For example, the PRB group occupied by the first resource set and the PRB group occupied by the second resource set are adjacent or overlap in time domain.

With reference to the foregoing aspects and the foregoing implementations of the aspects, in another implementation, an interval in time domain between a PRB group occupied by the first resource set and a PRB group occupied by the second resource set is less than or equal to a preset time domain threshold.

With reference to the foregoing aspects and the foregoing implementations of the aspects, in another implementation, the first time-frequency resource group and the third time-frequency resource group occupy different symbols in time domain, and occupy same subcarriers in frequency domain, and an interval between symbols occupied by the first time-frequency resource group and symbols occupied by the third time-frequency resource group in time domain is less than or equal to a specified time threshold. For example, the symbols occupied by the first time-frequency resource group are adjacent to the symbols occupied by the third time-frequency resource group in time domain.

With reference to the foregoing aspects and the foregoing implementations of the aspects, in another implementation, the first time-frequency resource group and the third time-frequency resource group occupy same symbols in time domain, and occupy different subcarriers in frequency domain. For example, subcarriers occupied by the first time-frequency resource group and subcarriers occupied by the third time-frequency resource group in frequency domain are adjacent or overlap.

With reference to the foregoing aspects and the foregoing implementations of the aspects, in another implementation, when the first demodulation reference signal is further used to demodulate the second downlink data, the method further includes: prohibiting the network device from sending, by using the second resource set, a reference signal used to demodulate the second downlink data.

With reference to the foregoing aspects and the foregoing implementations of the aspects, in another implementation, when the first demodulation reference signal is further used to demodulate the second downlink data, and the second downlink data is sent by using the third time-frequency resource group, the method further includes: prohibiting the network device from sending, by using the third time-frequency resource group, a reference signal used to demodulate the second downlink data.

According to a seventh aspect, a reference signal sending method is provided. The method includes: sending, by a network device, downlink control information and a first demodulation reference signal to a terminal device by using a first time-frequency resource group in a resource set, where the first demodulation reference signal is used to demodulate the downlink control information, configuration information of the first demodulation reference signal is first configuration information in at least two types of configuration information, each of the at least two types of configuration information includes at least one of the following parameters: a sequence used by a demodulation reference signal, a density of a time-frequency resource that carries the demodulation reference signal in one time-frequency resource group, an antenna port associated with the demodulation reference signal, and a location of the time-frequency resource that carries the demodulation reference signal, and any two types of configuration information include at least one different parameter; and sending, by the network device, a second demodulation reference signal and downlink data to the terminal device by using a second time-frequency resource group in the resource set, where the second demodulation reference signal is used to demodulate the downlink data.

Optionally, configuration information used by the second demodulation reference signal in the second time-frequency resource group is the first configuration information.

Optionally, configuration information used by the second demodulation reference signal in the second time-frequency resource group is second configuration information in the at least two types of configuration information.

Optionally, the network device sends first indication information to the terminal device, where the first indication information indicates the configuration information used by the second demodulation reference signal in the second time-frequency resource group.

According to the reference signal sending method in this embodiment of this application, when there is a time-frequency resource group remaining (in other words, not occupied by control information) in a resource set used to transmit control information, data can be sent by using the remaining time-frequency resource group, and the data and the control information are demodulated based on different reference signals, so that demodulation of both data and control information can be ensured, and resource utilization efficiency can be improved.

According to an eighth aspect, a reference signal receiving method is provided. The method includes: receiving, by a terminal device, downlink control information and a first demodulation reference signal from a network device by using a first time-frequency resource group in a resource set; receiving, by the terminal device, a second demodulation reference signal and downlink data from the network device by using a second time-frequency resource group in the resource set, where configuration information of the first demodulation reference signal is first configuration information in at least two types of configuration information, each of the at least two types of configuration information includes at least one of the following parameters: a sequence used by a demodulation reference signal, a density of a time-frequency resource that carries the demodulation reference signal in one time-frequency resource group, an antenna port associated with the demodulation reference signal, and a location of the time-frequency resource that carries the demodulation reference signal, and any two types of configuration information include at least one different parameter; and demodulating, by the terminal device, the downlink control information based on the first demodulation reference signal, and demodulating the second downlink data based on the second demodulation reference signal.

Optionally, configuration information used by the second demodulation reference signal in the second time-frequency resource group is the first configuration information.

Optionally, configuration information used by the second demodulation reference signal in the second time-frequency resource group is second configuration information in the at least two types of configuration information.

Optionally, the terminal device receives first indication information sent by the network device, where the first indication information indicates the configuration information used by the second demodulation reference signal in the second time-frequency resource group.

With reference to the seventh aspect, the eighth aspect, and the foregoing implementations of the seventh aspect and the eighth aspect, in another implementation, the first demodulation reference signal and the second demodulation reference signal are obtained after processing by using a same precoding matrix.

With reference to the seventh aspect, the eighth aspect, and the foregoing implementations of the seventh aspect and the eighth aspect, in another implementation, the downlink control information and the downlink data are obtained after processing by using a same precoding matrix.

With reference to the seventh aspect, the eighth aspect, and the foregoing implementations of the seventh aspect and the eighth aspect, in another implementation, the first demodulation reference signal and the second demodulation reference signal are obtained after processing by using a same precoding matrix.

According to a ninth aspect, a reference signal sending apparatus is provided, including a unit configured to perform steps in any one of the first aspect, the third aspect, the fifth aspect, and the seventh aspect, and the implementations of the aspects.

Optionally, the apparatus includes a chip or a circuit, for example, a chip or a circuit that may be disposed in a network device.

Optionally, the apparatus is a network device.

According to a tenth aspect, a reference signal receiving apparatus is provided, including a unit configured to perform steps in any one of the second aspect, the fourth aspect, the sixth aspect, and the eighth aspect, and the implementations of the aspects.

Optionally, the apparatus includes a chip or a circuit, for example, a chip or a circuit that may be disposed in a terminal device.

Optionally, the apparatus is a terminal device.

According to an eleventh aspect, a communications device is provided, including a memory and a processor. The memory is configured to store a computer program, and the processor is configured to invoke the computer program from the memory and run the computer program, to enable the communications device to perform the method according to any one of the first aspect to the sixth aspect, and the implementations of the aspects.

According to a twelfth aspect, a chip system is provided, including a memory and a processor. The memory is configured to store a computer program, and the processor is configured to invoke the computer program from the memory and run the computer program, to enable a communications device in which the chip system is installed to perform the method according to any one of the first aspect to the sixth aspect, and the implementations of the aspects.

According to a thirteenth aspect, a computer program product is provided, and the computer program product includes computer program code. When the computer program code is run by a communications unit and a processing unit, or a transceiver and a processor of a communications device (such as a network device or a terminal device), the communications device is enabled to perform the method according to any one of the first aspect to the sixth aspect, and the implementations of the aspects.

According to a fourteenth aspect, a computer-readable storage medium is provided, and the computer-readable storage medium stores a program. The program enables a communications device (such as a network device or a terminal device) to perform the method according to any one of the first aspect to the sixth aspect, and the implementations of the aspects.

According to the reference signal sending method and apparatus, and the reference signal receiving method and apparatus in the embodiments of this application, a reference signal transmission process can be flexibly implemented, and a reference signal requirement of a service that has different reliability requirements can be met.

DETAILED DESCRIPTION OF ILLUSTRATIVE EMBODIMENTS

Figure 1:
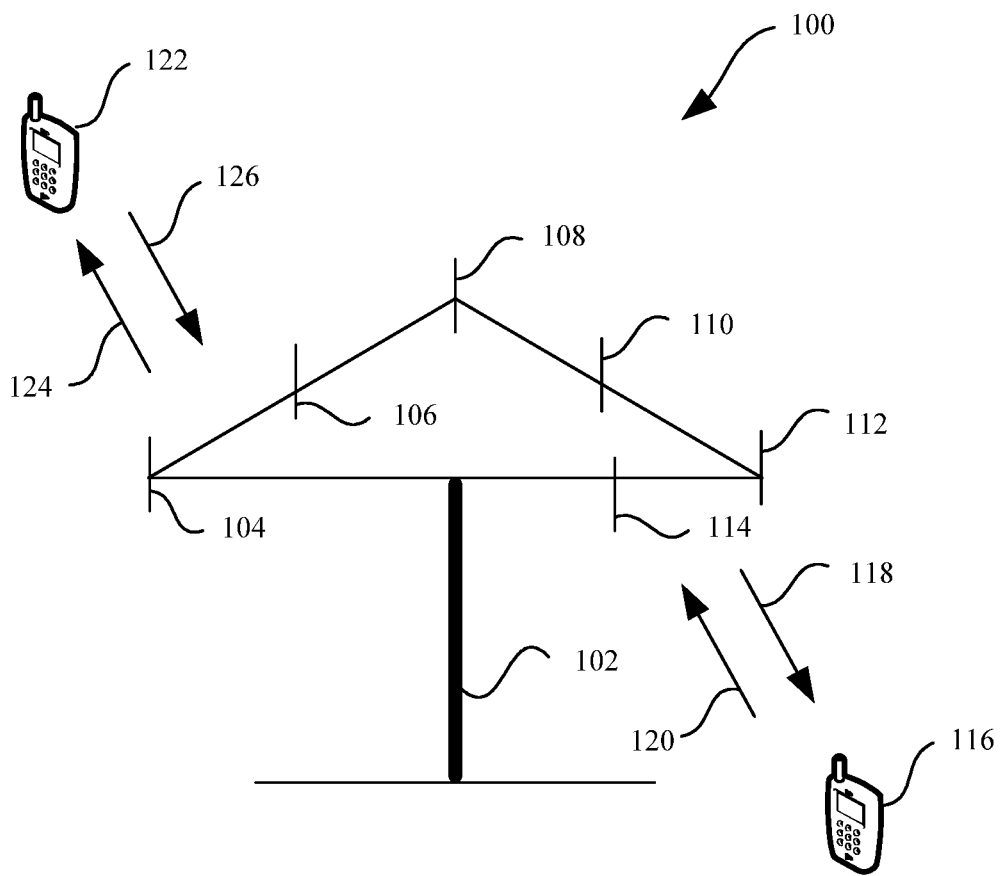
FIG. 1 is a schematic diagram of an example of a communications system according to an embodiment of this application.

The following describes technical solutions of this application with reference to accompanying drawings.

The technical solutions of the embodiments of this application may be applied to various communications systems, such as: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

Usually, a quantity of connections supported by a conventional communications system is limited and is also easy to implement. However, with development of communications technologies, a mobile communications system not only supports conventional communication but also supports, for example, device to device (D2D) communication, machine to machine (M2M) communication, machine type communication (MTC), and vehicle to vehicle (V2V) communication.

In the embodiments of this application, embodiments are described with reference to a network device and a terminal device.

The terminal device may be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a WLAN, and may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, an in-vehicle device, a wearable device, or a terminal device in a next-generation communications system, for example, a terminal device in a 5G network or a terminal device in a future evolved public land mobile network (PLMN) network.

By way of example, and not limitation, in the embodiments of this application, the terminal device may be alternatively a wearable device. The wearable device may also be referred to as a wearable intelligent device, and is a generic term of wearable devices, such as glasses, gloves, watches, clothing, and shoes, developed by performing intelligent design on daily wear by using a wearable technology. The wearable device is a portable device directly worn on a body or integrated into clothes or an accessory of a user. The wearable device is more than a hardware device, and implements powerful functions through software support, data interaction, and cloud interaction. In a broad sense, wearable intelligent devices include a large-sized device, for example, a smartwatch or smart glasses, that provide comprehensive functions and that can implement a complete or partial function independent of a smartphone; and include a device, for example, various types of smart bands and smart jewelry for somatic feature monitoring, that is intended for only a specific type of application functions and that needs to be used in conjunction with another device such as a smartphone.

Further, the network device may be a device configured to communicate with a mobile device. The network device may be an access point (AP) in a WLAN or a base transceiver station (BTS) in GSM or CDMA, or may be a NodeB (NB) in WCDMA; or may be an evolved NodeB (eNB or eNodeB) in LTE, or a relay node or an access point, or an in-vehicle device, a wearable device, a network device in a future 5G network, a network device in a future evolved PLMN network, or the like.

Furthermore, in the embodiments of this application, the network device provides a service for a cell, and the terminal device communicates with the network device by using a transmission resource (for example, a frequency domain resource, in other words, a spectrum resource) used in the cell. The cell may be a cell corresponding to the network device (for example, a base station). The cell may belong to a macro base station or may belong to a base station corresponding to a small cell. The small cell herein may include a metro cell, a micro cell, a pico cell, a femto cell, and the like. These cells are characterized by a small coverage area and low transmit power, and are suitable for providing a high-rate data transmission service.

In addition, in the LTE system or the 5G system, a plurality of intra-frequency cells may simultaneously work on a carrier. In some special scenarios, it may also be considered that concepts of the carrier and the cell are equivalent. For example, in a carrier aggregation (CA) scenario, when a secondary component carrier is configured for UE, a carrier index of the secondary component carrier and a cell identifier (Cell ID) of a secondary serving cell working on the secondary component carrier are both carried. In this case, it may be considered that the concepts of the carrier and the cell are equivalent. For example, for the UE, accessing a carrier is equivalent to accessing a cell.

A method and an apparatus that are provided in the embodiments of this application may be applied to the terminal device or the network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). An operating system may be any one or more types of computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, the embodiments of this application do not particularly limit a specific structure of an execution body of the method provided in the embodiments of this application, provided that a program recording code of the method provided in the embodiments of this application can be run to implement communication according to the method provided in the embodiments of this application. For example, the execution body of the method provided in the embodiments of this application may be a terminal device or a network device, or may be a function module capable of invoking and executing a program in the terminal device or the network device.

In addition, aspects or features in the embodiments of this application may be implemented as a method, an apparatus, or a product that uses standardized programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smartcard, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a wireless communications system according to an embodiment of this application. As shown in FIG. 1, the communications system 100 includes a network device 102. The network device 102 may include one or more antennas, for example, antennas 104, 106, 108, 110, 112, and 114. In addition, the network device 102 may additionally include a transmitter chain and a receiver chain. A person of ordinary skill in the art may understand that, the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it can be understood that the network device 102 may communicate with any quantity of terminal devices similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antennas 112 and 114. The antennas 112 and 114 send information to the terminal device 116 through a forward link (also referred to as a downlink) 118, and receive information from the terminal device 116 through a reverse link (also referred to as an uplink) 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or area that are/is designed for communication is referred to as a sector of the network device 102. For example, an antenna group may be designed to communicate with a terminal device in a sector of a coverage area of the network device 102. The network device may send signals to all terminal devices in a sector corresponding to the network device by using a single antenna or multi-antenna transmit diversity. In a process of communicating with the terminal devices 116 and 122 by the network device 102 by respectively using the forward links 118 and 124, transmit antennas of the network device 102 may use beamforming to improve signal-to-noise ratios of the forward links 118 and 124. In addition, compared with a manner in which a network device uses a single antenna or multi-antenna transmit diversity to send signals to all terminal devices served by the network device, when the network device 102 uses beamforming to send signals to the terminal devices 116 and 122 that are randomly scattered in the related coverage area, interference to a mobile device that is in a neighboring cell is less.

Within a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a quantity of data bits that need to be transmitted to the wireless communications receiving apparatus through a channel. The data bits may be included in a transport block (or a plurality of transport blocks) of data, and the transport block may be segmented to generate a plurality of code blocks.

In addition, the communications system 100 may be a PLMN network, a D2D network, an M2M network, or another network. FIG. 1 is merely a simplified schematic diagram of an example. The network may further include another network device that is not drawn in FIG. 1.

Figure 2:
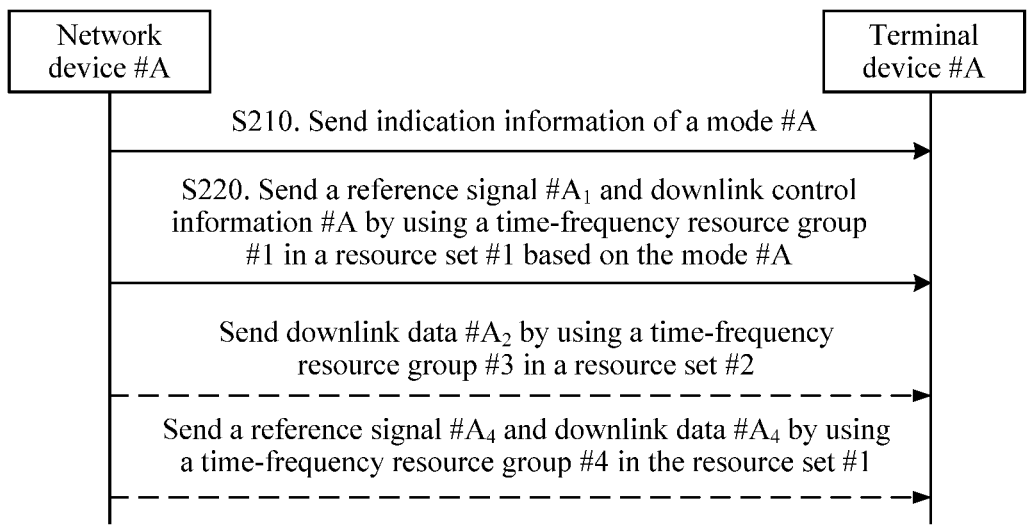
FIG. 2 is a schematic interaction diagram of an example of a reference signal transmission process according to an embodiment of this application.

In the following, with reference to FIG. 2, a process of transmitting a reference signal #$A_1$ (which is an example of a first demodulation reference signal) between a network device # A (which is an example of a network device) and a terminal device # A (which is an example of a terminal device) is used as an example to describe in detail a reference signal sending and receiving method 200 in the embodiments of this application. FIG. 2 is a schematic interaction diagram of the reference signal sending and receiving method 200 according to an embodiment of this application. There may be at least two types of reference signals in a communications system (for example, the communications system 100) applicable to the method 200.

By way of example, and not limitation, in this embodiment of this application, reference signals may be used for channel sounding, and are further used for demodulation. For example, the reference signals in this embodiment of this application may include a demodulation reference signal (DMRS).

The at least two types of reference signals include a reference signal (denoted as a reference signal #1 for ease of understanding and differentiation below) used to demodulate control information (in other words, a control channel). In addition, by way of example, and not limitation, the control information may include downlink control information (DCI), and the control channel may include a physical downlink control channel (PDCCH).

Further, the at least two types of reference signals include a reference signal (denoted as a reference signal #2 for ease of understanding and differentiation below) used to demodulate data (in other words, a data channel). In addition, by way of example, and not limitation, the data may include downlink data, and the data channel may include a physical downlink data channel (PDSCH).

It should be understood that, that the reference signal is used as a reference signal used for channel sounding or channel estimation is merely an example for description, and shall not constitute any limitation on this embodiment of this application. This application does not exclude a possibility that another name is used in an existing or future protocol to replace the reference signal to implement a same function of the reference signal.

In this embodiment of this application, at least one of the at least two types of reference signals corresponds to at least two types of configuration information. For example, the foregoing reference signal #1 may have two or more types of configuration information, and/or the foregoing reference signal #2 may have two or more types of configuration information.

In this embodiment of this application, "configuration information" is an example of a generic term of the following parameters, and is not particularly limited in this application. For example, "configuration information" may also be referred to as a "mode".

The following describes in detail "configuration information" in this embodiment of this application.

In this embodiment of this application, the "configuration information" may include one or more of the following parameters.

Parameter A: Density (which is Specifically a Density of a Time-Frequency Resource that Carries a Reference Signal in One Time-Frequency Resource Group)

By way of example, and not limitation, in this embodiment of this application, each time-frequency resource group may include at least two time-frequency resources.

By way of example, and not limitation, the time-frequency resource may be a resource element (RE). In this case, the time-frequency resource group may be a resource element group (REG).

For ease of understanding and differentiation, the following describes in detail the reference signal sending and receiving method in this embodiment of this application by using an REG as a time-frequency resource group.

In this embodiment of this application, the "density" may also be referred to as a reference signal density, and may be a ratio of time-frequency resources (for example, REs) used to carry a reference signal to one time-frequency resource group (for example, one REG).

It is assumed that the reference signal density is p, and then p=B/P.

B represents a quantity of time-frequency resources (for example, REs) that carry a reference signal in one time-frequency resource group (for example, one REG), and P represents a quantity of all time-frequency resources included in the time-frequency resource group.

It should be understood that a specific unit of the time-frequency resource enumerated above is merely an example for description. This application is not limited thereto. Any one of the technologies in the art may be used to define the time-frequency resource in any unit as required. Correspondingly, elements included in the time-frequency resource group enumerated above may also be used to define the time-frequency resource in any form.

For example, the time-frequency resource group may be defined as time-frequency resources that correspond to a specified quantity of symbols in time domain and that correspond to a specified quantity of subcarriers in frequency domain.

In this case, the reference signal density may also be a ratio of subcarriers that carry a reference signal in one time-frequency resource group to all subcarriers included in the time-frequency resource group.

Alternatively, in this case, the reference signal density may be a ratio of symbols that carry a reference signal in one time-frequency resource group to all symbols included in the time-frequency resource group.

In this embodiment of the present invention, that parameters of two types of configuration information are different may mean that a reference signal density corresponding to one of the two types of configuration information is different from a reference signal density corresponding to the other of the two types of configuration information.

Figure 3:
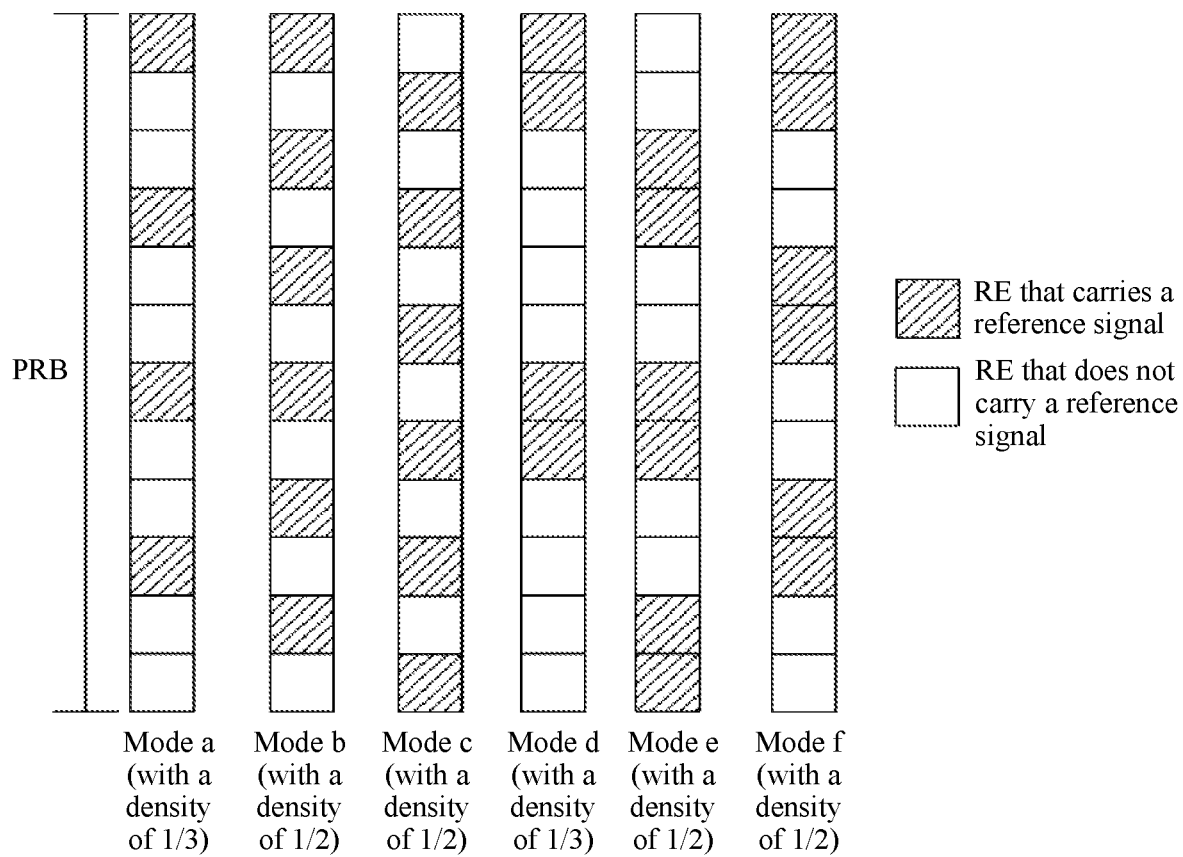
FIG. 3 is a schematic diagram of a reference signal density and a reference signal location according to an embodiment of this application.

FIG. 3 is a schematic diagram of an example of a possible reference signal density according to an embodiment of this application. For example, as shown in FIG. 3, in configuration information a and configuration information d that correspond to a type of reference signal (for example, the reference signal #1 or the reference signal #2), a quantity of REs that carry the reference signal is 4, a total quantity of REs in An REG is 12, and An reference signal density in each of the configuration information a and the configuration information d that correspond to the reference signal is 4/12=1/3.

For another example, as shown in FIG. 3, in configuration information b, configuration information c, configuration information e, and configuration information f that correspond to the reference signal, a quantity of REs that carry the reference signal is 6, a total quantity of REs in An REG is 12, and a reference signal density in the configuration information b corresponding to the reference signal is 6/12=1/2.

Parameter B: Location (which is Specifically a Location of a Time-Frequency Resource that Carries a Reference Signal in One Time-Frequency Resource Group)

In this embodiment of this application, the "location" may also be referred to as a reference signal location, and may be a location of a time-frequency resource (for example, an RE) used to carry a reference signal in one time-frequency resource group (for example, one REG). A definition of the time-frequency resource group is similar to that in the description about the "density". To avoid repetition, detailed descriptions thereof are omitted herein.

It should be understood that the foregoing enumerated definition of the "location" is merely an example for description. This application is not limited thereto. For example, the time-frequency resource group may be defined as time-frequency resources that correspond to a specified quantity of symbols in time domain and that correspond to a specified quantity of subcarriers in frequency domain.

In this case, the reference signal location may also be frequency domain locations of subcarriers that carry a reference signal in one time-frequency resource group among all subcarriers included in the time-frequency resource group.

Alternatively, in this case, the reference signal location may be time domain locations of symbols that carry a reference signal in one time-frequency resource group among all symbols included in the time-frequency resource group.

In this embodiment of the present invention, that parameters of two types of configuration information are different may indicate that a reference signal location corresponding to one of the two types of configuration information is different from a reference signal location corresponding to the other of the two types of configuration information.

FIG. 3 is a schematic diagram of an example of a possible reference signal location according to an embodiment of this application. For example, as shown in FIG. 3, in this embodiment of this application, reference signal locations may be different for any two pieces of configuration information with different densities. For example, a reference signal location corresponding to any one (with a density of 1/3) of configuration information a and configuration information b may be different from a reference signal location corresponding to any one (with a density of 1/2) of configuration information d, configuration information c, configuration information e, and configuration information f.

In addition, in this embodiment of this application, reference signal locations may be different for two pieces of configuration information that have a same density. For example, reference signal locations corresponding to the configuration information a and the configuration information b (with a density of 1/3) may be different. For another example, reference signal locations corresponding to any two (with a density of 1/2) of the configuration information d, the configuration information c, the configuration information e, and the configuration information f may be different.

It should be additionally noted that, for any two pieces of configuration information that have different densities, some locations (in other words, time-frequency resources corresponding to the some locations) of reference signal locations corresponding to configuration information with a lower density may belong to reference signal locations (in other words, time-frequency resources corresponding to the reference signal locations) corresponding to configuration information with a higher density.

For example, some of reference signal locations corresponding to the configuration information a may belong to reference signal locations corresponding to the configuration information d or the configuration information c.

For another example, some of reference signal locations corresponding to the configuration information d may belong to reference signal locations corresponding to the configuration information e or the configuration information f.

By way of example, and not limitation, in this embodiment of this application, the reference signal locations corresponding to the configuration information with a lower density may be further a subset of the reference signal locations corresponding to the configuration information with a higher density.

Parameter C: Sequence (which is Specifically a Sequence Used by a Reference Signal)

In this embodiment of this application, the "sequence" may also be referred to as a reference signal sequence, and may be a sequence used by a reference signal.

By way of example, and not limitation, in this embodiment of this application, the sequence used by the reference signal may include a pseudo-random (PN) sequence.

Optionally, in this embodiment of this application, the reference signal may be obtained through calculation by using the following formulas:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{Formula (1)}$$

$$m = 0, 1, \ldots, h \times N_{RB}^{max,DL} - 1$$

-continued $$c_{init\_1} = 2^{10} \cdot (7 \cdot (n'_s + 1) + l + 1) \cdot (2 \cdot N_{ID}^{CSI} + 1) + 2 \cdot N_{ID}^{CSI} + N_{CP}, \text{ or}$$

$$c_{init\_2} = (\lfloor n_s/2 \rfloor + 1) \cdot (2N_{ID}^{cell} + 1) \cdot 2^{16} + n_{RNTI}, \text{ or}$$

$$c_{init\_3} = 2^{10} \cdot (7 \cdot (n'_s + 1) + l + 1) \cdot (2 \cdot N_{ID}^{cell} + 1) + 2 \cdot N_{ID}^{cell} + N_{CP} + n_{RNTI}.$$

When a reference signal serves as a discovery reference signal (DRS), $n_s' = 10\lfloor n_s/10 \rfloor + n_s \mod 2$. In other cases (to be specific, a reference signal provides a function other than a discovery reference signal), $n_s' = n_s$.

Herein, $r_{l,n_s}(m)$ represents an $m^{th}$ sequence element on an $l^{th}$ symbol in $n_s$ slots, and a presented form of $r_{l,n_s}(m)$ is a complex number form obtained by modulating a PN sequence.

Herein, $c_{init\_1}$ and $c_{init\_3}$ are used to determine a sequence of reference signals on a symbol, and $c_{init\_2}$ is used to determine sequences of reference signals in a time unit (for example, a subframe).

When $c_{init\_1}$ and $c_{init\_3}$ are used, h represents a quantity of reference signals carried in each PRB. In other words, h represents a quantity of resources (for example, REs) used to carry reference signals in each PRB. Herein, h may be determined based on a desired reference signal density. By way of example, and not limitation, when a reference signal density in one PRB (which is an example of a time-frequency resource group) is expected to be ½, it may be assumed that h=6. For another example, when a reference signal density in one PRB (which is an example of a time-frequency resource group) is expected to be ⅓, it may be assumed that h=4. It should be understood that the foregoing enumerated values of h are merely examples for description. This application is not limited thereto.

When $c_{init\_2}$ is used, h=r×h' and h' represents a quantity of reference signals carried in each PRB. In other words, h' represents a quantity of resources (for example, REs) used to carry reference signals in each PRB. r represents a quantity of symbols included in one time unit (for example, a subframe), and h' may be determined based on a desired reference signal density. By way of example, and not limitation, when a reference signal density in one PRB (which is an example of a time-frequency resource group) is expected to be ½, it may be assumed that h'=6. For another example, when a reference signal density in one PRB (which is an example of a time-frequency resource group) is expected to be ⅓, it may be assumed that h'=4. It should be understood that the foregoing enumerated values of h' are merely examples for description. This application is not limited thereto.

Optionally, the symbol may be an orthogonal frequency division multiplexing (OFDM) symbol, or may be a symbol that is defined in a future protocol and that is used to represent a time unit. This is not particularly limited in this embodiment of this application. $N_{RB}^{max,DL}$ represents a maximum quantity of resource blocks (RB) included in a downlink channel. c is a PN sequence, and may be generated by a PN sequence generator (for example, a gold (Gold) sequence generator) based on an initialization sequence $c_{init}$. $N_{ID}^{CSI}$ is an identifier of a demodulation reference signal, may be a cell identifier $N_{ID}^{cell}$, or may be an identifier configured by a higher layer. $N_{CP}$ is a cyclic prefix identifier and corresponds to a normal CP, and $N_{CP}=1$. For an extended CP, $N_{CP}=0$. $n_{RNTI}$ is an identifier of UE.

It may be learned from the foregoing formulas that, when $[0, h \times N_{RB}^{max,DL} - 1]$ is traversed for a value of m, a PN sequence may be obtained. The PN sequence includes $h \times N_{RB}^{max,DL}$ sequence elements, each sequence element is a complex number signal, each sequence element may be referred to as a value of a demodulation reference signal, and $h \times N_{RB}^{max,DL}$ sequence elements may mean that a length of a sequence is $h \times N_{RB}^{max,DL}$. In this embodiment of the present invention, that parameters of two types of configuration information are different may indicate that a reference signal sequence corresponding to one of the two types of configuration information is different from a reference signal sequence corresponding to the other of the two types of configuration information.

That sequences are different may mean that lengths of the sequences are different.

Alternatively, that sequences are different may mean that when different initialization values are used for initialization of a pseudo-random sequence generator, generated pseudo-random sequences are different (even if lengths of the sequences are the same).

Parameter D: Port (which is Specifically an Antenna Port Corresponding to a Reference Signal)

In this embodiment of this application, a same network device may distinguish different antenna ports in a CDM manner, a frequency division multiplexing (FDM) manner, a time division multiplexing (TDM) manner, or the like. If FDM or TDM is used, frequency domain resources or time domain resources occupied by reference signals of different antenna ports may be different. If CDM is used, time-frequency resources occupied by reference signals of different antenna ports may be the same, and different antenna ports are distinguished by using multiplexing codes.

Further, in this embodiment of this application, CDM may include frequency domain CDM and time domain CDM.

In addition, in this embodiment of this application, different reference signals can be configured in a same symbol. In other words, a plurality of (two or more) reference signals may be sent in the frequency domain CDM manner.

It should be noted that the antenna port may also be referred to as a reference signal port, or more specifically, may be understood as a reference signal port that is not precoded through beamforming. The reference signal is defined by a reference signal port, and each reference signal corresponds to one antenna port.

In this embodiment of the present invention, that parameters of two types of configuration information are different may indicate that an antenna port corresponding to one of the two types of configuration information is different from an antenna port corresponding to the other of the two types of configuration information.

It should be understood that the foregoing enumerated parameters included in the "configuration information" are merely examples of descriptions, and are not particularly limited in this application. Other parameters that can distinguish different configuration information fall within the protection scope of the embodiments of this application.

In this embodiment of this application, a same type of reference signal (for example, the reference signal #1 or the reference signal #2) may correspond to a plurality of types (two or more types) of configuration information, in other words, a same reference signal (for example, belonging to the reference signal #1 or the reference signal #2) may correspond to a plurality of types of configuration information, where a plurality of pieces of configuration information corresponding to a same reference signal are different in terms of at least one type of the foregoing parameters A, B, C, and D.

To be specific, in this embodiment of this application, the reference signal #1 may correspond to a plurality of types of configuration information.

Further, in this embodiment of this application, the reference signal #2 may correspond to a plurality of types of configuration information.

In addition, by way of example, and not limitation, one or more pieces of same configuration information may exist in configuration information corresponding to the reference signal #1 and configuration information corresponding to the reference signal #2. Alternatively, each piece of configuration information corresponding to the reference signal #1 and each piece of configuration information corresponding to the reference signal #2 may be different. This is not particularly limited in this application.

Therefore, in S210, the network device # A may determine a plurality of (two or more) pieces of configuration information corresponding to the reference signal # $A_1$. Specifically, the network device # A may determine a reference signal type (in other words, a demodulation object) of the reference signal # $A_1$, and determine the plurality of pieces of configuration information corresponding to the reference signal # $A_1$ based on the reference signal type of the reference signal # $A_1$.

For example, if the reference signal # $A_1$ belongs to a reference signal (namely, the reference signal #1) used to demodulate control information, the network device # A may determine the plurality of pieces of configuration information corresponding to the reference signal # $A_1$ based on a plurality of pieces of configuration information corresponding to the reference signal #1.

For example, if the reference signal # $A_1$ belongs to a reference signal (namely, the reference signal #2) used to demodulate data, the network device # A may determine the plurality of pieces of configuration information corresponding to the reference signal # $A_1$ based on a plurality of pieces of configuration information corresponding to the reference signal #2.

Subsequently, the network device # A may determine, in the plurality of pieces of configuration information corresponding to the reference signal # $A_1$, configuration information (denoted as configuration information # A for ease of understanding and differentiation below) used when the reference signal # $A_1$ is sent to the terminal device # A.

By way of example, and not limitation, in this embodiment of this application, the network device # A may determine the configuration information # A by using any one of the following methods.

Method 1

In this embodiment of this application, the network device # A may store a mapping relationship #1 (which is an example of a first mapping relationship), and the mapping relationship #1 may be used to indicate a one-to-one mapping relationship between a plurality of (two or more) types of information formats and a plurality of (two or more) types of configuration information.

By way of example, and not limitation, in this embodiment of this application, an information format may be an information format of control information (for example, downlink control information).

In this embodiment of this application, a function of the control information may include but is not limited to the following aspects: scheduling uplink transmission or downlink transmission, requesting to report an aperiodic channel quality indicator (CQI), notifying an uplink power control command, and the like. Different information formats may have different functions.

Further, in this embodiment of this application, different services may use different information formats.

Furthermore, by way of example, and not limitation, in this embodiment of this application, a plurality of information formats may have a one-to-one mapping relationship with a plurality of service types.

In addition, by way of example, and not limitation, in this embodiment of this application, the plurality of service types may include but are not limited to: an ultra-reliable and low latency communications (URLLC) type; and an evolved mobile broadband (eMBB) type.

Specifically, the international telecommunication union-radio communication sector (ITU-R) defines three main types of future 5G application scenarios: an eMBB service, a mass-connected Internet of Things (mMTC) service, and an ultra-reliable and low latency communications (URLLC) service, and defines a capability requirement for a 5G network from eight dimensions such as a throughput rate, a latency, a connection density, and spectral efficiency improvement. The eMBB service mainly requires a high rate, wide coverage, a transmission latency, and mobility. The URLLC service mainly requires very high reliability, very low mobility, and very low transmission latency. Usually, a wireless air interface is required to achieve transmission reliability of 99.999% within 1 millisecond (ms). In other words, because different services (in other words, service types) have different transmission reliability requirements, different services (in other words, service types) may use reference signals corresponding to different configuration information.

To be specific, in this embodiment of this application, different service types may correspond to different information formats. For example, an information format A is used to schedule transmission of the eMBB service, and an information format B is used to schedule transmission of the eMBB service.

Table 1 below shows an example of the mapping relationship #1.

TABLE 1

| Information format of control information | Configuration information of a reference signal |
|---|---|
| Information format A | Configuration information #1 (for example, with a density of ½) |
| Information format B | Configuration information #2 (for example, with a density of ⅓) |

It should be understood that a specific correspondence enumerated in Table 1 is merely an example for description, and this embodiment of this application is not limited thereto. A person skilled in the art may randomly set or change the mapping relationship #1 based on an actual requirement, provided that it can be ensured that one piece of configuration information can be uniquely determined based on a specific information format.

Therefore, the network device # A may determine an information format of the control information (denoted as downlink control information # A for ease of understanding and differentiation below) demodulated by using the reference signal # $A_1$.

Further, the network device # A may use, as the configuration information # A based on the information format of the downlink control information # A, configuration information corresponding to the information format of the downlink control information # A in the plurality of pieces of configuration information corresponding to the reference signal # $A_1$.

Method 2

In this embodiment of this application, the network device # A may store a mapping relationship #3 (which is an example of a third mapping relationship), and the mapping relationship #3 may be used to indicate a one-to-one mapping relationship between a plurality of (two or more) types of channel formats and a plurality of (two or more) types of configuration information.

By way of example, and not limitation, in this embodiment of this application, a channel format may be a use form (for example, an aggregation level) of a resource used to carry control information.

Optionally, in this embodiment of this application, a plurality of types of channel formats may be determined based on a quantity of control channel elements (CCE) occupied by control information and a quantity of REGs occupied by the control information. Table 2 below shows a difference between different channel formats.

TABLE 2

| Channel format of a control channel | Quantity of occupied CCEs (CCE aggregation level) | Quantity of occupied REGs (REG aggregation level) |
| --- | --- | --- |
| Channel format 0 | 1 | 6 |
| Channel format 1 | 2 | 12 |
| Channel format 2 | 4 | 24 |
| Channel format 3 | 8 | 48 |

Specifically, as shown in Table 2, different channel formats may occupy different quantities of CCEs and different quantities of REGs.

It should be noted that in this embodiment of this application, that the control information "occupies" CCEs (or REGs) may mean that the control information is carried in some resources in the "occupied" CCEs (or REGs), or that the control information "occupies" CCEs (or REGs) may mean that the control information is carried in all resources in the "occupied" CCEs (or REGs). This is not particularly limited in this application.

Table 3 below shows an example of the mapping relationship #3.

TABLE 3

| Channel format of control information | Configuration information of a reference signal |
| --- | --- |
| Channel format 0 | Configuration information #1 (for example, with a density of ⅓) |
| Channel format 1 | Configuration information #2 (for example, with a density of ⅓) |
| Channel format 2 | Configuration information #3 (for example, with a density of ½) |
| Channel format 3 | Configuration information #4 (for example, with a density of ½) |

It should be understood that a specific correspondence enumerated in Table 2 is merely an example for description, and this embodiment of this application is not limited thereto. A person skilled in the art may randomly set or change the mapping relationship #3 based on an actual requirement, provided that it can be ensured that one piece of configuration information can be uniquely determined based on a specific channel format.

Therefore, the network device # A may determine a channel format (in other words, an aggregation level) corresponding to (specifically, of a channel that carries) the control information (denoted as downlink control information # A for ease of understanding and differentiation below) demodulated by using the reference signal # $A_1$.

Further, the network device # A may use, as the configuration information # A based on the channel format corresponding to the downlink control information # A, configuration information corresponding to the channel format corresponding to the downlink control information # A in the plurality of pieces of configuration information corresponding to the reference signal # $A_1$.

Further, by way of example, and not limitation, in this embodiment of this application, a plurality of channel formats may have a one-to-one mapping relationship with a plurality of service types.

Furthermore, by way of example, and not limitation, in this embodiment of this application, the plurality of service types may include but are not limited to: a URLLC type and an eMBB type.

In addition, when a reference signal density is relatively high, a possibility of successful demodulation increases, and therefore transmission reliability is relatively high. Therefore, for example, for the reference signal #1, if the reference signal #1 is used to demodulate control information of a URLLC service, when the reference signal #1 is transmitted, configuration information with a relatively high density (for example, ½) may be used. In this case, it may be specified that when the URLLC service is transmitted, control information may be transmitted by using a control channel in the channel format 2 or a control channel in the channel format 3. Further, it may be determined according to the foregoing Table 3 that, the configuration information corresponding to the channel format 2 or the channel format 3 is used to transmit a reference signal.

For another example, for the reference signal #1, if the reference signal #1 is used to demodulate control information of an eMBB service, when the reference signal #1 is transmitted, configuration information with a relatively low density (for example, ⅓) may be used. In this case, it may be specified that when the eMBB service is transmitted, control information may be transmitted by using a control channel in the channel format 0 or a control channel in the channel format 1. Further, it may be determined according to the foregoing Table 3 that, the configuration information corresponding to the channel format 0 or the channel format 1 is used to transmit a reference signal.

Method 3

In this embodiment of this application, the network device # A may store a mapping relationship #2 (which is an example of a second mapping relationship), and the mapping relationship #2 may be used to indicate a one-to-one mapping relationship between a plurality of (two or more) service types and a plurality of (two or more) types of configuration information.

By way of example, and not limitation, in this embodiment of this application, the plurality of service types may include but are not limited to: a URLLC type; and an eMBB type.

Because different services (in other words, service types) have different transmission reliability requirements, different services (in other words, service types) may use reference signals of different configuration information.

In addition, when a reference signal density is relatively high, a possibility of successful demodulation increases, and therefore transmission reliability is relatively high. Therefore, for example, for the reference signal #1, if the reference signal #1 is used to demodulate control information of a URLLC service, when the reference signal #1 is transmitted, configuration information with a relatively high density (for example, ½) may be used.

For another example, for the reference signal #1, if the reference signal #1 is used to demodulate control information of an eMBB service, when the reference signal #1 is transmitted, configuration information with a relatively low density (for example, ⅓) may be used.

For example, for the reference signal #2, if the reference signal #2 is used to demodulate data of a URLLC service, when the reference signal #2 is transmitted, configuration information with a relatively high density (for example, ½) may be used.

For another example, for the reference signal #2, if the reference signal #2 is used to demodulate data of an eMBB service, when the reference signal #2 is transmitted, configuration information with a relatively low density (for example, ⅓) may be used.

Table 4 below shows an example of the mapping relationship #2.

TABLE 4

| Service type | Configuration information |
| --- | --- |
| eMBB | Configuration information #1 (for example, with a density of ⅓) |
| eMBB | Configuration information #2 (for example, with a density of ⅓) |
| URLLC | Configuration information #3 (for example, with a density of ½) |
| URLLC | Configuration information #4 (for example, with a density of ½) |

It should be understood that a specific correspondence enumerated in Table 4 is merely an example for description, and this embodiment of this application is not limited thereto. A person skilled in the art may randomly set or change the mapping relationship #2 based on an actual requirement, provided that it can be ensured that configuration information of a reference signal used when a service is transmitted can be determined based on a specific service type.

Therefore, the network device # A may determine a service type (denoted as a service type # A for ease of understanding below) of a service to which the control information or data demodulated by using the reference signal # $A_1$ belongs.

Further, the network device # A may use, as the configuration information # A based on the service type # A, configuration information corresponding to the service type # A in the plurality of pieces of configuration information corresponding to the reference signal # $A_1$.

In addition, in S210, the network device # A may send indication information (which is an example of first indication information) of the configuration information # A to the terminal device # A.

Therefore, the terminal device # A may learn of, based on the indication information, configuration information (namely, the configuration information # A) used when the network device # A sends the reference signal # $A_1$ (specifically when the reference signal # $A_1$ is sent by using the following time-frequency resource group #1).

In S220, the network device # A may send the reference signal # $A_1$ to the terminal device # A based on the configuration information # A by using one or more time-frequency resource groups (denoted as a time-frequency resource group #1 for ease of understanding and differentiation below), and the network device may send, to the terminal device # A, downlink information that needs to be demodulated by using the reference signal # $A_1$.

For example, when parameters of the configuration information # A include a reference signal density, in each of the one or more time-frequency resource groups #1, a reference signal density is the reference signal density corresponding to the configuration information # A.

For another example, when parameters of the configuration information # A include a reference signal location, a location of the reference signal # $A_1$ in the one or more time-frequency resource groups #1 is the reference signal location corresponding to the configuration information # A.

For still another example, when parameters of the configuration information # A include a sequence used by a reference signal, a sequence used by the reference signal # $A_1$ in the one or more time-frequency resource groups #1 is the sequence corresponding to the configuration information # A.

For yet another example, when parameters of the configuration information # A include an antenna port associated with a reference signal, an antenna port used to send the reference signal # $A_1$ by using the one or more time-frequency resource groups #1 is the antenna port corresponding to the configuration information # A.

Correspondingly, the terminal device # A may receive the reference signal # $A_1$ from the network device # A based on the configuration information # A by using the one or more time-frequency resource groups #1, and the terminal device # A may receive, from the network device # A, downlink information that needs to be demodulated by using the reference signal # $A_1$, and demodulate the downlink information based on the reference signal # $A_1$.

According to the reference signal sending method or the reference signal receiving method in this embodiment of this application, one reference signal is enabled to correspond to a plurality of types of configuration information, so that in actual service transmission, the network device can select, from the plurality of types of configuration information, one type of configuration information that matches a current service, in other words, that can ensure transmission reliability of a current service, thereby meeting a requirement for a reference signal of a service that has different reliability requirements.

It should be noted that in this embodiment of this application, the foregoing downlink information that needs to be demodulated by using the reference signal # A may include downlink data # $A_1$ (which is an example of first downlink data) or downlink control information # A (which is an example of first downlink control information).

In addition, when the downlink information includes the downlink control information # $A_1$ in this embodiment of this application, the reference signal # A may be further used to demodulate downlink data # $A_2$ (which is an example of second downlink data).

The following describes the foregoing process in detail.

In this embodiment of this application, data or information may be sent by using a resource set, and one resource set may include one or more time-frequency resource groups.

By way of example, and not limitation, in this embodiment of this application, a resource set used to transmit control information may also be referred to as a control resource set (CORESET).

In addition, one CORESET may include a plurality of REGs (which is an example of a time-frequency resource group).

In the following, for ease of understanding and differentiation, a COREST that is used to carry the downlink control information # A and the reference signal # A is denoted as a resource set #1 (which is an example of a first resource set).

Figure 4:
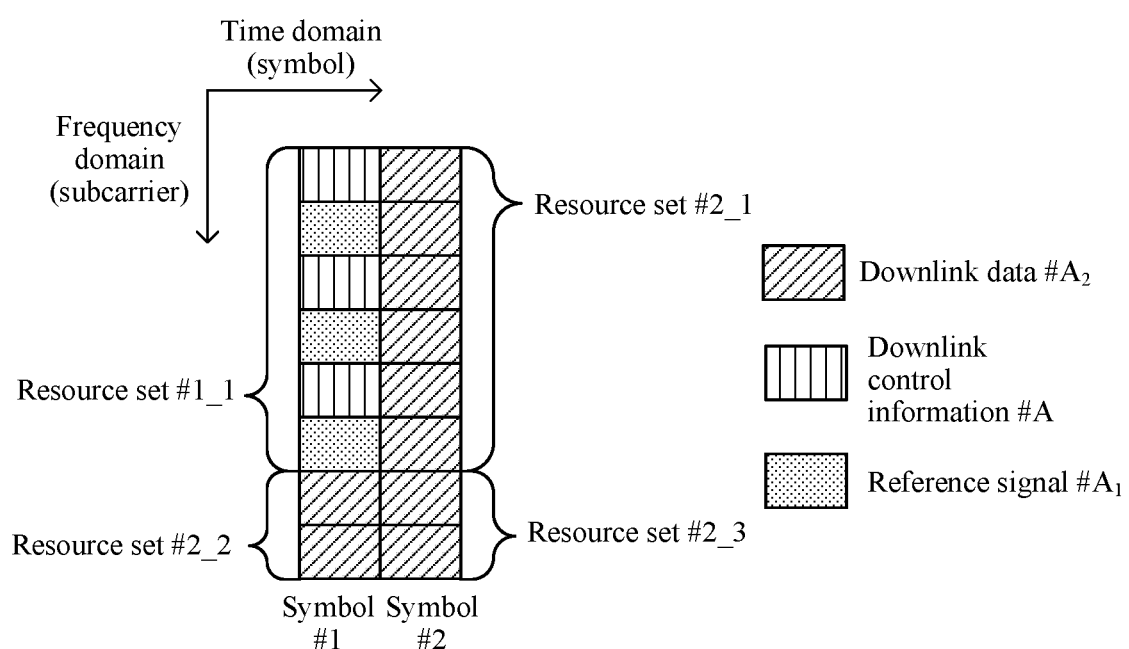
FIG. 4 is a schematic diagram of an example of resource distribution according to an embodiment of this application.
Figure 5:
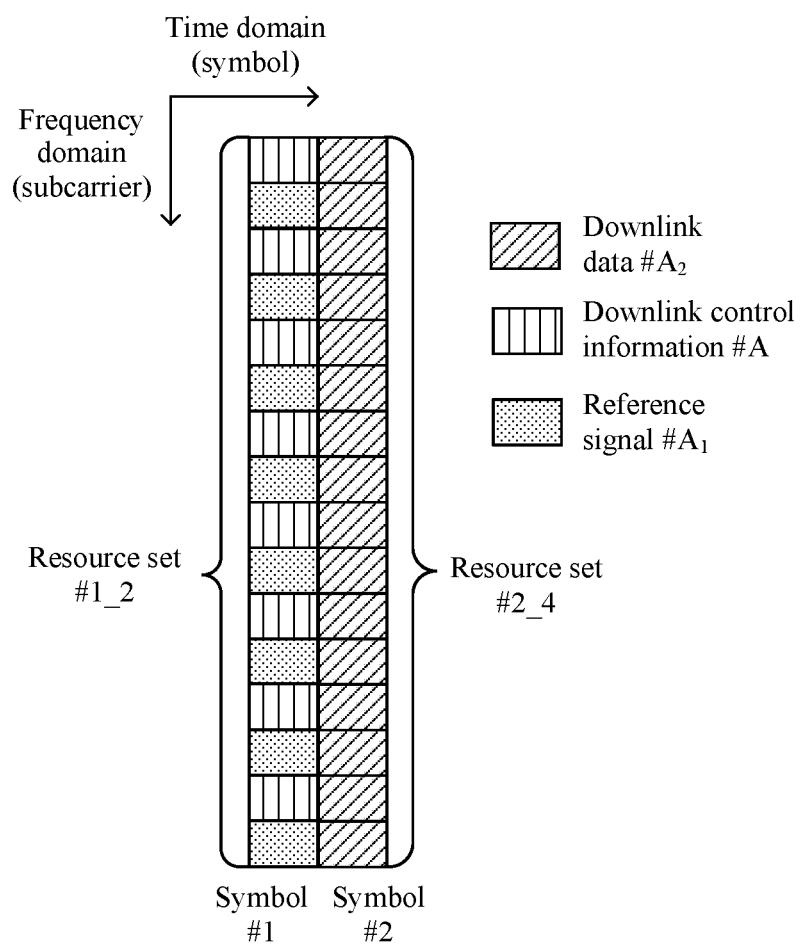
FIG. 5 is a schematic diagram of another example of resource distribution according to an embodiment of this application.

By way of example, and not limitation, as shown in FIG. 4, the resource set #1 may occupy one symbol in time domain and six subcarriers in frequency domain. For another example, as shown in FIG. 5, the resource set #1 may occupy one symbol in time domain and 16 subcarriers in frequency domain.

It should be understood that the foregoing enumerated structure of the resource set #1 (for example, a quantity of occupied subcarriers or symbols) is merely an example for description, and is not particularly limited in this application. A person skilled in the art may randomly set or change, as required, a quantity of symbols or subcarriers occupied by the resource set #1.

Optionally, in this embodiment of this application, the network device # A may further send the downlink data # $A_2$ to the terminal device # A by using a resource set #2.

In this case, in this embodiment of this application, two manners may be provided for transmitting the downlink data # $A_2$.

Manner 1: The downlink data # $A_2$ is demodulated based on the reference signal # A.

In this embodiment of this application, a specified (time-domain or frequency-domain) location relationship needs to be met between two resource sets (for example, the resource set #2 and the resource set #1) respectively occupied by control information (for example, the downlink control information # A) and data (for example, the downlink data # $A_2$) demodulated based on a same reference signal.

Optionally, in this embodiment of this application, a spacing between the resource set #2 and the resource set #1 in frequency domain needs to be less than or equal to a preset threshold #1 (which is an example of a second threshold). By way of example, and not limitation, the threshold #1 may be a value specified in a communications system or a protocol. For example, the threshold #1 may be a size (for example, six subcarriers) of frequency domain resources corresponding to one RB or one RB group.

By way of example, and not limitation, as shown in FIG. 4, subcarriers occupied by a resource set #2_1 (which is an example of the resource set #2) and subcarriers occupied by a resource set #1_1 (which is an example of the resource set #1) may be the same (which is an example in which a spacing in frequency domain is 0).

For another example, as shown in FIG. 4, subcarriers occupied by a resource set #2_2 (which is another example of the resource set #2) may be adjacent to subcarriers occupied by a resource set #1_1 (which is another example in which a spacing in frequency domain is 0).

For still another example, as shown in FIG. 4, subcarriers occupied by a resource set #2_3 (which is still another example of the resource set #2) may be adjacent to subcarriers occupied by a resource set #1_1 (which is an example in which a spacing in frequency domain is 0).

For yet another example, as shown in FIG. 5, subcarriers occupied by a resource set #2_4 (which is yet another example of the resource set #2) and subcarriers occupied by a resource set #1_2 (which is another example of the resource set #1) may be the same (which is an example in which a spacing in frequency domain is 0).

It should be understood that the foregoing location relationship between the resource set #2 and the resource set #1 enumerated in FIG. 4 or FIG. 5 is merely an example for description, and this application is not limited thereto. For example, subcarriers occupied by the resource set #2 and the subcarriers occupied by the resource set #1 may alternatively be spaced apart by one or more (less than or equal to the threshold #1) subcarriers.

Optionally, in this embodiment of this application, an interval between the resource set #2 and the resource set #1 in time domain needs to be less than or equal to a preset threshold #2 (which is an example of a first threshold). By way of example, and not limitation, the threshold #2 may be a value configured or preset by a communications system. The "configured" means that the network device is required to send configuration information to the terminal device. For example, the threshold #2 may be a size (for example, one or two symbols) of time domain resources corresponding to one RB or one RB group.

By way of example, and not limitation, as shown in FIG. 4, symbols occupied by the resource set #2_1 or the resource set #2_3 may be adjacent to symbols occupied by the resource set #1_1 (which is an example in which an interval in time domain is 0).

For example, as shown in FIG. 4, symbols occupied by the resource set #2_2 may be the same as symbols occupied by the resource set #1_1 (which is another example in which an interval in frequency domain is 0).

For another example, as shown in FIG. 5, the symbols occupied by the resource set #2_4 may be adjacent to symbols occupied by the resource set #1_2 (which is another example in which an interval in time domain is 0).

It should be understood that the foregoing enumerated location relationship is merely an example for description. This application is not limited thereto. For example, when a resource set is an RB or an RB group, there may be the following case: Although the foregoing location relationship is met between the resource set #2 and the resource set #1, time-frequency resource groups #1 (for example, one or more REGs) that are in the resource set #1 and that are used to carry the downlink control information # A and the reference signal # A and some time-frequency resource groups (denoted as time-frequency resource groups #2 for ease of understanding and description below) in the resource set #2 are relatively widely spaced (in frequency domain or time domain). In this case, if data carried in a time-frequency resource group #2 is demodulated based on the reference signal # A, a success rate of demodulation is relatively low, which may lower transmission reliability.

For this reason, in this embodiment of this application, the time-frequency resource groups #1 that are in the resource set #1 and that are used to carry the control information # A and the reference signal # A and a time-frequency resource group (which is an example of a third time-frequency resource group, and is denoted as a time-frequency resource group #3 for ease of understanding and description below) that is in the resource set #2 and that is used to carry the downlink data # $A_2$ need to meet a specified (time-domain or frequency-domain) location relationship.

Optionally, the location relationship may be that a spacing between the time-frequency resource group #1 and the time-frequency resource group #3 in frequency domain needs to be less than or equal to a preset threshold #3 (which is an example of a fourth threshold). By way of example, and not limitation, the threshold #3 may be a value specified in a communications system or a protocol. For example, the threshold #3 may be a size (for example, six subcarriers) of frequency domain resources corresponding to one RB or one RB group.

Alternatively, the location relationship may be that an interval between the time-frequency resource group #1 and the time-frequency resource group #3 in time domain needs to be less than or equal to a preset threshold #4 (which is an example of a third threshold). By way of example, and not limitation, the threshold #4 may be a value specified in a communications system or a protocol. For example, the threshold #4 may be a size (for example, one or two symbols) of time domain resources corresponding to one RB or one RB group.

By way of example, and not limitation, it is assumed that lengths (for example, a length of a sequence on one symbol) of sequences of reference signals (denoted as reference signals # X for ease of understanding and differentiation below) used to demodulate downlink data are t, where the sequence length t of the reference signals # X may be determined based on a quantity of time-frequency resources (for example, PRBs) used to carry the reference signals # X, for example, the length t may be determined according to Formula (i).

It is assumed that the (for example, consecutive) time-frequency resources used to carry the reference signals # X are a time-frequency resource #0 to a time-frequency resource # n (for example, the time-frequency resource #0 to the time-frequency resource # n correspond to one symbol), and the time-frequency resource # m to the time-frequency resource # k (for example, that are consecutive) in the time-frequency resource #0 to the time-frequency resource # n are configured as a CORESET used to carry control information. In addition, it is assumed that lengths of sequences of reference signals (denoted as reference signals # Y for ease of understanding and differentiation below) that are carried on the time-frequency resource # m to the time-frequency resource # k and that are used to demodulate control information are u.

Then, the network device may add the first p sequences of the sequences of the reference signals # X (in other words, the first sequence to the $p^{th}$ sequence of the sequences of the reference signals # X whose length is t) to the time-frequency resource #0 to the time-frequency resource # m−1, where specific values of the p sequences may correspond to sizes of the time-frequency resource #0 to the time-frequency resource # m−1.

Further, the network device may not add, to the time-frequency resource # m to the time-frequency resource # k, u sequences that are in the sequences of the reference signals # X and that follow the p sequences (in other words, the $(p+1)^{th}$ sequence to the $(p+u)^{th}$ sequence in the sequences of the reference signals # X whose length is t), and downlink data may be demodulated based on the reference signals # Y carried in the time-frequency resource # m to the time-frequency resource # k.

In addition, the network device may add the last t−p−u sequences in the sequences of the reference signals # X to the time-frequency resource # k to the time-frequency resource # n (in other words, the $(p+u+1)^{th}$ sequence to the $t^{th}$ sequence of the sequences of the reference signals # X whose length is t).

In other words, in this embodiment of this application, in the sequences of the reference signals # X whose length is t, the $(p+1)^{th}$ sequence to the $(p+u)^{th}$ sequence are skipped.

It should be noted that in this embodiment of this application, the length of the reference sequence may be a length of a sequence on one symbol, to be specific, a length of a sequence generated according to the foregoing Formula (i) is a length of a sequence on one symbol, and a value of t may be a length of a sequence generated according to the foregoing Formula (i).

Alternatively, the length of the reference sequence may be lengths of sequences on a plurality of symbols (for example, a plurality of symbols included in one transmission time interval TTI), to be specific, lengths of sequences generated according to the foregoing Formula (i) are lengths of sequences on a plurality of symbols, and a value of t may be a length of a sequence that is in the lengths of the sequences generated according to the foregoing Formula (i) and that is located on one symbol of the CORESET.

As shown in FIG. 4, in this embodiment of this application, when a same symbol (for example, a symbol #1) carries both downlink data and downlink control information, if a time-frequency resource (for example, an RE #1) to which a DMRS used to demodulate downlink data (for example, the downlink data # $A_2$) needs to be mapped is the same as a time-frequency resource (for example, the RE #1) to which a DMRS used to demodulate downlink control information (for example, the downlink control information # A) needs to be mapped, the DMRS used to demodulate the downlink data is not mapped to the RE #1. In this case, the downlink data (for example, the downlink data # $A_2$) may be demodulated based on the DMRS used to demodulate the downlink control information (for example, the downlink control information # A).

In addition, as shown in FIG. 5, when the downlink control information is not carried on a same symbol (for example, a symbol #2) as the downlink data, in other words, only the downlink data (for example, the downlink data # $A_2$) is carried, if a frequency range corresponding to a time-frequency resource (for example, an RE #2) to which the DMRS used to demodulate the downlink data (for example, the downlink data # $A_2$) needs to be mapped is the same as a frequency range corresponding to a time-frequency resource (for example, an RE #3) to which the DMRS used to demodulate the downlink control information (for example, the downlink control information # A) needs to be mapped, the DMRS used to demodulate the downlink data is not mapped to the RE #2. In this case, the downlink data (for example, the downlink data # $A_2$) may be demodulated based on the DMRS used to demodulate the downlink control information (for example, the downlink control information # A).

Optionally, in this embodiment of this application, the network device # A may perform precoding processing on the reference signal # A and the downlink control information # A based on a precoding matrix # A (which is an example of a first precoding matrix).

Further, the network device # A may further perform, based on the precoding matrix # A, precoding processing on data (including the downlink data # $A_2$) carried in a resource set (namely, the resource set #2) used to carry the downlink data # $A_2$.

In addition, when the resource set #2 carries a reference signal (denoted as a reference signal # $A_2$ for ease of understanding and description below), the network device # A may further perform precoding processing on the reference signal # $A_2$ based on the precoding matrix # A.

It should be noted that configuration information (specifically, parameters included in the configuration information) of the reference signal # $A_2$ and the reference signal # $A_1$ may be the same or different. This is not particularly limited in this application.

Optionally, when the resource set #1 occupies one or more RBs (or RB groups), the network device # A may further perform, based on the precoding matrix # $A_1$ precoding processing on data carried in an RB group # $A_1$, where the RB group # $A_1$ includes RBs (or RB groups) occupied by the resource set #1.

In addition, when the RB group # $A_1$ carries a reference signal (denoted as a reference signal # $A_3$ for ease of understanding and description below), the network device # A may further perform precoding processing on the reference signal # $A_3$ based on the precoding matrix # A.

Optionally, when the resource set #2 occupies one or more RBs (or RB groups), the network device # A may further perform, based on the precoding matrix # A, precoding processing on data carried in an RB group # $A_2$, where the RB group # $A_2$ includes RBs (or RB groups) occupied by the resource set #2.

In addition, when the RB group # $A_2$ carries a reference signal (denoted as a reference signal # $A_4$ for ease of understanding and description below), the network device # A may further perform precoding processing on the reference signal # $A_4$ based on the precoding matrix # A.

Figure 6:
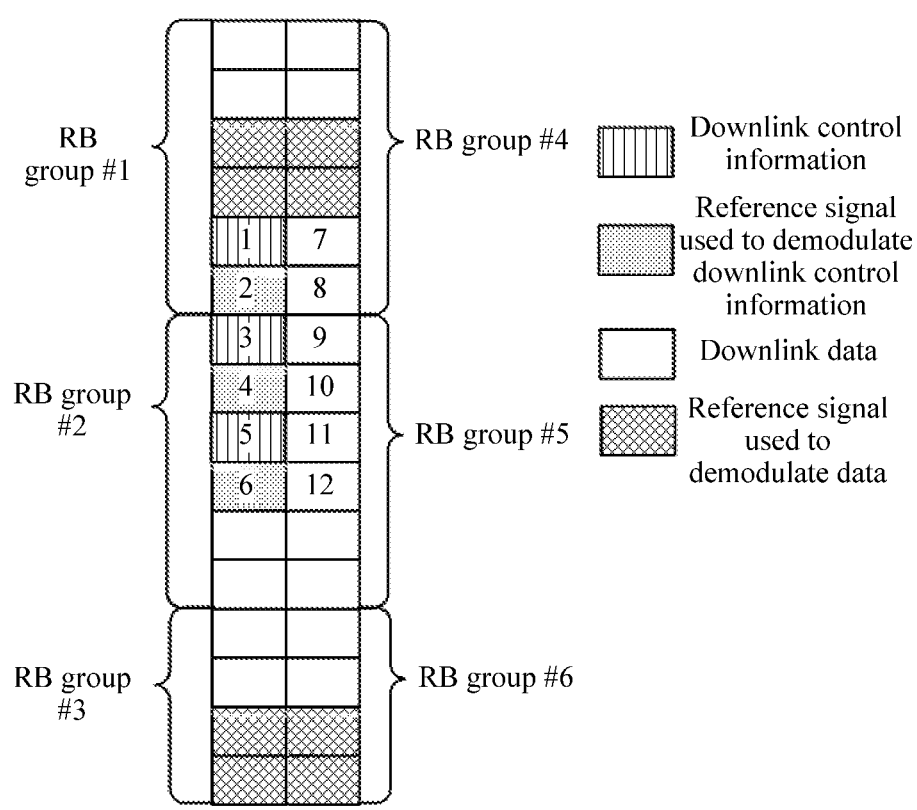
FIG. 6 is a schematic diagram of still another example of resource distribution according to an embodiment of this application.

For example, as shown in FIG. 6, on a symbol # A, the resource set #1 (occupying REs numbered 1 to 6) occupies an RB group #1 and an RB group #2 (specifically, some REs in the RB group #1 and the RB group #2). Therefore, the network device # A may perform, based on the precoding matrix # A, precoding processing on a reference signal and data carried in the RB group #1 and the RB group #2.

For another example, as shown in FIG. 6, on a symbol # A, the resource set #1 does not occupy a time-frequency resource in an RB group #3, and data or control information that needs to be demodulated based on the reference signal # A is not carried in the RB group #3. Therefore, the network device # A may perform, without using the precoding matrix # A, precoding processing on a reference signal and data carried in the RB group #3.

For still another example, as shown in FIG. 6, on a symbol # B, the resource set #2 (occupying REs numbered 7 to 12) occupies an RB group #4 and an RB group #5 (specifically, some REs in the RB group #4 and the RB group #5), in other words, the RB group #4 and the RB group #5 carry data that needs to be demodulated based on the reference signal # A. Therefore, the network device # A may perform, based on the precoding matrix # A, precoding processing on a reference signal and data carried in the RB group #4 and the RB group #5.

For yet another example, as shown in FIG. 6, on a symbol # B, the resource set #6 does not occupy a time-frequency resource in an RB group #3, and data or control information that needs to be demodulated based on the reference signal # A is not carried in the RB group #6. Therefore, the network device # A may perform, without using the precoding matrix # A, precoding processing on a reference signal and data carried in the RB group #6.

In other words, in this embodiment of this application, if a downlink control channel is in a same REG or consecutive N REGs, the downlink control channel and a DMRS associated with the downlink control channel need to use a same precoding matrix, where N may be a value preset by a system, for example, N may be a quantity of REGs included in one RB group.

In addition, in this embodiment of this application, a same precoding matrix needs to be used for a downlink data channel in a same RB or consecutive M RBs and a DMRS associated with the downlink data channel, where M may be a value preset by the system, for example, M may be a quantity of RBs included in one RB group.

For example, as shown in FIG. 6, a same precoding matrix is used in one resource element group REG in the resource set #1, and on the symbol # B, when a downlink data channel is mapped, a downlink data channel and a DMRS associated with the downlink data channel in one RB group use a same precoding matrix. Because resource elements 5 and 6 on the symbol # B and the resource set #1 are located at a same location in frequency domain, all REs in a PRB group 4 use a same precoding matrix as that used by a downlink control channel in an REG. Similarly, all REs in a PRB group 5 also use a same precoding matrix as that used by a downlink control channel in an REG.

For ease of understanding of this embodiment of this application, the following briefly describes a precoding processing process in wireless communication. A processing object of a downlink physical channel processing process is a code word, and the code word is usually a coded (including at least channel coding) bit stream. The code word is scrambled to generate a scrambled bit stream. The scrambled bit stream undergoes modulation mapping to obtain a modulation symbol stream. The modulation symbol stream is mapped to a plurality of layers through layer mapping. For ease of differentiation and description, in this embodiment of this application, a symbol stream obtained after layer mapping may be referred to as a layer-mapped spatial layer (or referred to as a layer-mapped spatial stream or a layer-mapped symbol stream). The layer-mapped spatial layer undergoes precoding processing based on a precoding matrix to obtain a plurality of precoded data streams (or referred to as precoded symbol streams). The precoded symbol stream is mapped to a plurality of REs through resource element (RE) mapping. These REs are then modulated through orthogonal frequency division multiplexing (OFDM) to generate OFDM symbol streams. The OFDM symbol streams are then transmitted through an antenna port.

According to the reference signal sending method or the reference signal receiving method in this embodiment of this application, a same precoding matrix is used to perform precoding processing on data and control information that are demodulated by sharing a same reference signal. Therefore, complexity of precoding processing and complexity of a channel design can be reduced, so that a processing load of the network device can be reduced, and communication efficiency can be improved.

Manner 2: The downlink data # $A_2$ is demodulated based on a reference signal # A'.

A resource (namely, the resource set #2) that carries the downlink data # $A_2$ may be similar to that in the foregoing Manner 1 To avoid repetition, detailed descriptions thereof are omitted herein.

It is assumed that a time-frequency resource group used to carry the reference signal # A' is a time-frequency resource group #1'.

Then, in this embodiment of this application, the time-frequency resource group #1' may belong to the resource set #1.

Alternatively, the time-frequency resource group #1' may belong to the resource set #2.

When the time-frequency resource group #1' belongs to the resource set #2, transmission modes of the downlink data # $A_2$ and the reference signal # A' may be similar to those in the prior art. To avoid repetition, detailed descriptions thereof are omitted herein.

The following mainly describes in detail a processing manner in which the time-frequency resource group #1' may belong to the resource set #1.

In this embodiment of this application, a precoding matrix used by the reference signal # A' may be different from a precoding matrix used by the reference signal # A. In this case, to ensure communication accuracy and reliability, preferably, the reference signal # A' and the reference signal # A do not multiplex a time-frequency resource, in other words, preferably, the time-frequency resource group #1' does not intersect with the time-frequency resource group #1.

However, because a configuration pattern of a reference signal in a resource set is specified in advance, there is a case in which the time-frequency resource group #1' and the time-frequency resource group #1 overlap in the resource set #1, in other words, the time-frequency resource group #1' includes at least one same time-frequency resource as that of the time-frequency resource group #1.

In this case, a time-frequency resource to which a DMRS used to demodulate downlink data (for example, the downlink data # $A_2$) needs to be mapped, for example, a time-frequency resource in the time-frequency resource group #1', may be offset based on a preset offset, and the DMRS used to demodulate the downlink data (for example, the downlink data # $A_2$) is sent on a time-frequency resource obtained after the offsetting.

The offset may include an offset (for example, one or more symbols) in time domain. In this case, for example, offsetting the time-frequency resource to which the DMRS used to demodulate the downlink data needs to be mapped may include offsetting the time-frequency resource in time domain backwards by the offset (one or more symbols), in other words, a time-frequency resource corresponding to an interval between the time-frequency resource and the time-frequency resource that is consistent with the offset in time domain may be used as a time-frequency resource, of the DMRS, used to send the downlink data.

Alternatively, the offset may include an offset (for example, one or more REs) in frequency domain. In this case, for example, offsetting the time-frequency resource to which the DMRS used to demodulate the downlink data needs to be mapped may include offsetting the time-frequency resource in frequency domain by the offset (one or more REs) in a high-frequency (or low-frequency) direction, in other words, a time-frequency resource corresponding to a spacing between the time-frequency resource and the time-frequency resource that is consistent with the offset in frequency domain may be used as a time-frequency resource, of the DMRS, used to send the downlink data.

In addition, in this embodiment of this application, the "offsetting a time-frequency resource in the time-frequency resource group #1'" may mean that each time-frequency resource in the time-frequency resource group #1' is offset.

Alternatively, in this embodiment of this application, the "offsetting a time-frequency resource in the time-frequency resource group #1'" may mean that time-frequency resources in the time-frequency resource group #1' that overlap with the time-frequency resource group #1 are offset.

Optionally, in this embodiment of this application, the network device may further send indication information for a transmission mode (for example, the foregoing Manner 1 or the foregoing Manner 2) of the downlink data # $A_2$ to the terminal device, to be specific, the indication information may be used to indicate whether a reference signal used to demodulate the downlink data # $A_2$ and a reference signal used to demodulate the downlink control information # A are the same.

In this way, the terminal device can determine, based on the indication information, the reference signal used to demodulate the downlink data # $A_2$.

In this embodiment of this application, the preset offset may be specified in a communications system or a communication protocol. Therefore, the network device and the terminal device may determine the offset based on the specification of the communications system or the communication protocol, and the offset determined by the network device and the offset determined by the terminal device can be consistent.

Alternatively, in this embodiment of this application, the offset may be determined by the network device and notified to the terminal device.

The network device may semi-statically indicate the preset offset by using higher layer signaling (such as SIB or RRC signaling).

Alternatively, the network device may dynamically indicate the preset offset by using physical layer signaling (such as downlink control information (DCI)). Optionally, in this embodiment of this application, when the time-frequency resource groups #1 are some time-frequency resource groups in the resource set #1, and without loss of generality, one or more time-frequency resource groups other than the time-frequency resource group #1 in the resource set #1 are time-frequency resource groups #4 (which are examples of second time-frequency resource groups), the network device # A may further send downlink data # $A_4$ and the reference signal # $A_4$ (which is an example of a second demodulation reference signal) to the terminal device # A by using the time-frequency resource groups #4. The downlink data # $A_4$ is demodulated based on the reference signal # $A_4$.

Figure 7:
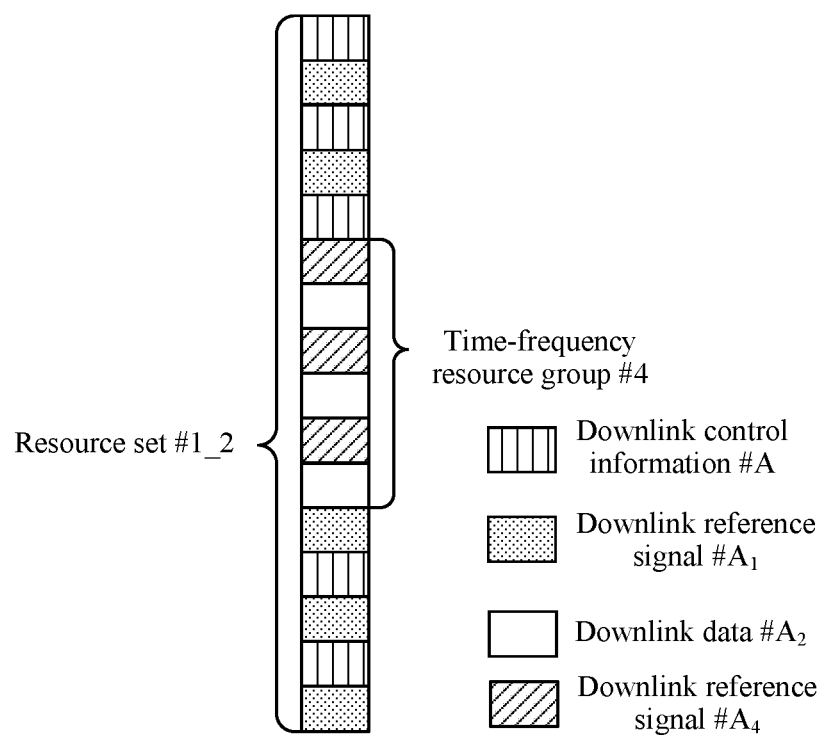
FIG. 7 is a schematic diagram of yet another example of resource distribution according to an embodiment of this application.

By way of example, and not limitation, as shown in FIG. 7, configuration information used by the reference signal # $A_4$ in the time-frequency resource set #1 may be the same as configuration information used by the reference signal # $A_1$ in the time-frequency resource set #1.

Figure 8:
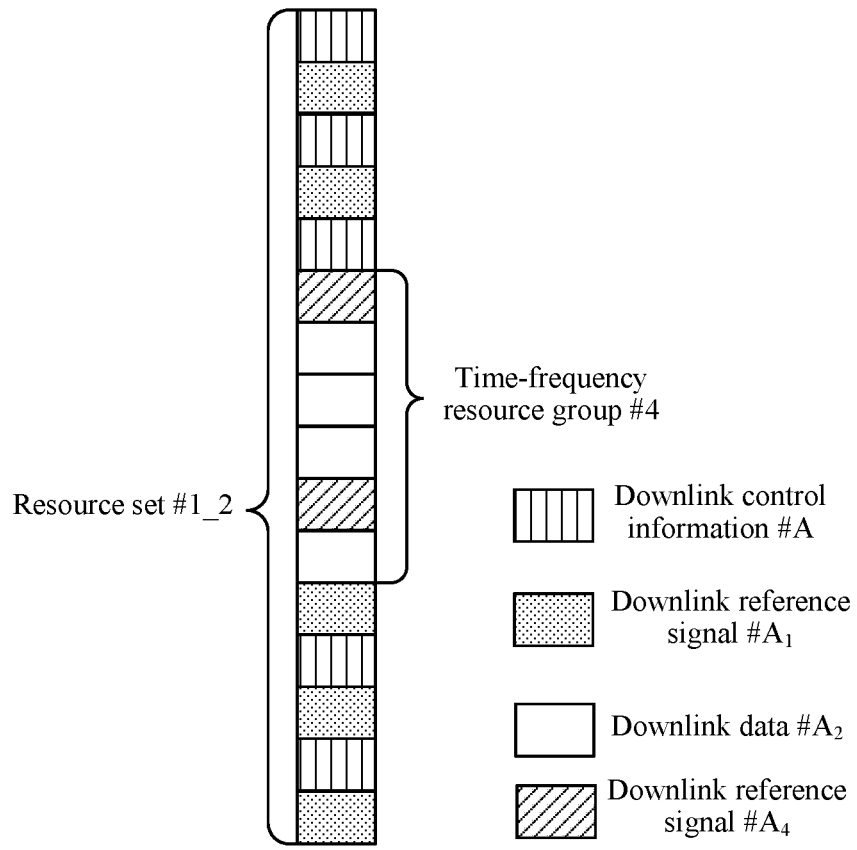
FIG. 8 is a schematic diagram of still yet another example of resource distribution according to an embodiment of this application.

Alternatively, by way of example, and not limitation, as shown in FIG. 8, configuration information used by the reference signal # $A_4$ in the time-frequency resource set #1 may be different from configuration information used by the reference signal # $A_1$ in the time-frequency resource set #1.

Specifically, in this embodiment of this application, the network device # A may configure, for the terminal device # A, a resource set (namely, a CORESET, for example, the resource set #1) used to transmit control information (for example, the control information # A), and the network device # A may send the configuration information # A to the terminal device # A, where the configuration information # A may include information # A_1 used to indicate resources (for example, symbols) occupied by the resource set #1 in time domain, and the configuration information # A may include information # A_2 used to indicate resources (for example, subcarriers) occupied by the resource set #1 in frequency domain. It should be understood that the foregoing enumerated information included (in other words, indicated content) in the configuration information # A is merely an example for description. This application is not limited thereto. For example, the configuration information # A may be further used to indicate REs, REGs, or PRBs occupied by the resource set #1.

Further, by way of example, and not limitation, in this embodiment of this application, the configuration information # A may further include indication information of the configuration information # A.

In addition, in this embodiment of this application, when the network device # A specifically sends downlink control information, there may be a case in which there is a remaining resource in the resource set #1, so that the network device # A may send data by using the remaining resource.

For example, when the network device # A sends downlink data on the remaining resource in the resource set #1, configuration information of a DMRS used to demodulate the data may be the same as configuration information of a DMRS used to demodulate downlink control information.

Alternatively, when the network device # A sends downlink data on the remaining resource in the resource set #1, configuration information of a DMRS used to demodulate the data may be different from configuration information of a DMRS used to demodulate downlink control information.

In addition, by way of example, and not limitation, in this embodiment of this application, precoding processing may be performed on reference signals, downlink control information, and data carried in the resource set #1 based on a same precoding matrix.

As shown in FIG. 7, a resource set #1 occupies a symbol #α in time domain, and data (for example, data scheduled by using the control information # A) sent by the network device # A to the terminal device # A occupies a symbol #β. When there is a remaining resource in the resource set #1 for sending data, a DMRS associated with downlink data sent in the resource set #1 and a DMRS associated with the control information # A are the same on the symbol #α (specifically, configuration information of the reference signals is the same). Therefore, complexity of performing channel estimation by a terminal can be reduced.

As shown in FIG. 8, a DMRS associated with downlink data sent in the resource set #1 on the symbol #α is the same as a DMRS associated with downlink data sent on a symbol #β. Therefore, a DMRS density can be reduced.

Optionally, the network device # A may further send indication information # A to the terminal device # A. The indication information # A indicates configuration information of a DMRS associated with data when the network device # A sends the data by using a remaining resource in the resource set #1, in other words, the indication information # A indicates whether the DMRS associated with the data is a DMRS associated with control information or a DMRS associated with a data channel on the symbol #β.

Therefore, configuration information of the DMRS can be flexibly used. For example, if there are a relatively small quantity of remaining resources in the resource set #1, a DMRS that is associated with data and that is carried on the remaining resources can use the configuration information of the DMRS associated with the control information. Alternatively, if there are a relatively large quantity of remaining resources in the resource set #1, a DMRS that is associated with data and that is carried on the remaining resources can use the configuration information of the DMRS that is associated with the data and that is carried on the symbol #β.

In addition, in this embodiment of this application, a DMRS associated with control information may mean that the DMRS associated with the control information is used to demodulate the control information.

Similarly, a DMRS associated with data may mean that the DMRS associated with the data is used to demodulate the data.

It should be noted that the reference signal # $A_4$ may also correspond to a plurality of types of configuration information, and a setting manner and a use manner of the plurality of types of configuration information of the reference signal # $A_4$ may be similar to those for the foregoing reference signal # $A_4$. To avoid repetition, detailed descriptions thereof are omitted herein. In addition, configuration information used by the reference signal # $A_4$ in the resource set #1 may be the configuration information # A, or configuration information used by the reference signal # $A_4$ in the resource set #1 may be configuration information that is determined by the network device in the plurality of types of configuration information corresponding to the reference signal # $A_4$ and that is different from the configuration information # A.

According to the reference signal sending and receiving method in this embodiment of this application, control information and downlink data are sent by using a same resource set, which can improve resource utilization efficiency and further improve communication efficiency.

Figure 9:
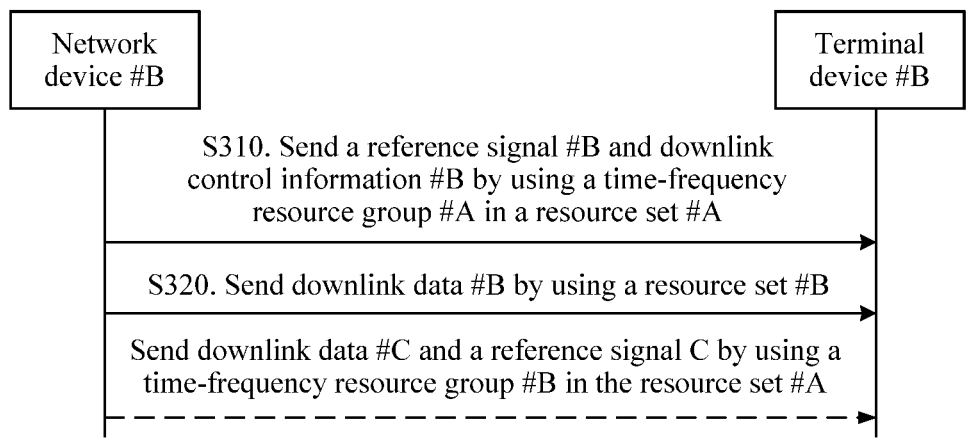
FIG. 9 is a schematic interaction diagram of another example of a reference signal transmission process according to an embodiment of this application.

In the following, with reference to FIG. 9, a process of transmitting a reference signal # B (which is an example of a first demodulation reference signal) between a network device # B (which is another example of a network device) and a terminal device # B (which is another example of a terminal device) is used as an example to describe in detail a reference signal sending and receiving method 300 in the embodiments of this application. FIG. 9 is a schematic interaction diagram of the reference signal sending and receiving method 300 according to an embodiment of this application. There may be at least two types of reference signals in a communications system (for example, the communications system 100) applicable to the method 300.

By way of example, and not limitation, in this embodiment of this application, reference signals may be used for channel sounding, and are further used for demodulation. For example, the reference signals in this embodiment of this application may include a DMRS.

The at least two types of reference signals include a reference signal (namely, a reference signal #1) used to demodulate control information (in other words, a control channel). In addition, by way of example, and not limitation, the control information may include downlink control information, and the control channel may include a physical downlink control channel.

Further, the at least two types of reference signals include a reference signal (namely, a reference signal #2) used to demodulate data (in other words, a data channel). In addition, by way of example, and not limitation, the data may include downlink data, and the data channel may include a physical downlink data channel.

In this embodiment of this application, configuration information of the reference signal #1 and configuration information of the reference signal #2 are different.

In this embodiment of this application, the reference signal #1 may have one type of configuration information, and the reference signal #1 may have one type of configuration information.

In addition, except that each type of reference signal corresponds to only one type of configuration information, a definition and a related description of the configuration information of the reference signal in the method 300 may be similar to the description about "configuration information" in the foregoing method 200. For example, parameters included in the configuration information in the method 300 may be similar to the parameters included in the configuration information described in the method 200. To avoid repetition, detailed descriptions thereof are omitted herein.

Herein, that configuration information of the reference signal #1 and configuration information of the reference signal #2 are different may mean that the configuration information of the reference signal #1 is different from the configuration information of the reference signal #2 in terms of at least one type of parameter.

In S310, the network device # B may send a reference signal # B to the terminal device # B by using a resource set # A (which is an example of a first resource set), and the network device # B may send, to the terminal device # B, downlink control information # B (which is an example of first downlink control information) that needs to be demodulated by using the reference signal # B. A structure and a determining method of the resource set # A may be similar to the structure and the determining method of the resource set #1 in the foregoing method 200. To avoid repetition, detailed descriptions thereof are omitted herein.

Further, in S320, the network device # B may send downlink data # B (which is an example of second downlink data) to the terminal device # B by using a resource set # B, where the downlink data # B is demodulated based on the reference signal # B. A structure and a determining method of the resource set # B may be similar to the structure and the determining method of the resource set #2 in the foregoing method 200. To avoid repetition, detailed descriptions thereof are omitted herein.

In addition, in this embodiment of this application, a preset location relationship (in frequency domain or time domain) needs to be met between the resource set # B and the resource set # A. The location relationship that needs to be met between the resource set # B and the resource set # A herein may be similar to the foregoing location relationship that needs to be met between the resource set #2 and the resource set #1. To avoid repetition, detailed descriptions thereof are omitted herein.

Optionally, it is assumed that the reference signal # B and the downlink control information # B are carried in a time-frequency resource group # A in the resource set # A, and that the downlink data # B is carried in a time-frequency resource group # B in the resource set # B. A preset location relationship (in frequency domain or time domain) needs to be met between the time-frequency resource group # A and the time-frequency resource group # B. The location relationship that needs to be met between the time-frequency resource group # A and the time-frequency resource group # B herein may be similar to the foregoing location relationship that needs to be met between the time-frequency resource group #1 and the time-frequency resource group #3. To avoid repetition, detailed descriptions thereof are omitted herein.

Optionally, in this embodiment of this application, the network device # B may perform precoding processing on the reference signal # B and the downlink control information # B based on a precoding matrix # B (which is another example of a first precoding matrix).

Further, the network device # B may further perform, based on the precoding matrix # B, precoding processing on data carried in a resource set (namely, the resource set # B) used to carry the downlink data # B.

In addition, when the resource set # B carries a reference signal, the network device # B may further perform precoding processing on the reference signal based on the precoding matrix # B.

Optionally, when the resource set # A (or the resource set # B) occupies one or more RBs (or RB groups), the network device # B may further perform precoding processing on the data carried in the RBs (or RB groups) based on the precoding matrix # B.

In addition, when the RBs (or RB groups) carry reference signals, the network device # B may further perform precoding processing on the reference signals based on the precoding matrix # B.

According to the reference signal sending method or the reference signal receiving method in this embodiment of this application, a same precoding matrix is used to perform precoding processing on data and control information that are demodulated by sharing a same reference signal. Therefore, complexity of precoding processing and complexity of a channel design can be reduced, so that a processing load of the network device can be reduced, and communication efficiency can be improved.

Optionally, in this embodiment of this application, the reference signal # B and the downlink control information # B may be sent by using one or more time-frequency resource groups # A. In addition, when the time-frequency resource groups # A are some time-frequency resource groups in the resource set # A, and without loss of generality, one or more time-frequency resource groups other than the time-frequency resource group # A in the resource set # A are time-frequency resource groups # B (which are examples of second time-frequency resource groups), the network device # B may further send downlink data # C and a reference signal # C (which is an example of a second demodulation reference signal) to the terminal device # B by using the time-frequency resource groups # B. The downlink data # C is demodulated based on the reference signal # C.

Configuration information of the reference signal # C may be the same as configuration information of the reference signal # B.

Alternatively, configuration information of the reference signal # C may be different from configuration information of the reference signal # B.

Herein, except that both the reference signal # C and the reference signal # B may correspond to only one type of configuration information, a relationship between the reference signal # C and the reference signal # B may be similar to the relationship between the reference signal # $A_4$ and the reference signal # $A_1$ described in the foregoing method 200. To avoid repetition, detailed descriptions thereof are omitted herein.

In the method 300, except that the network device does not need to determine configuration information and deliver first indication information of the configuration information to the terminal device, other processes may be similar to the processes described in the foregoing method 200. To avoid repetition, detailed descriptions thereof are omitted herein.

According to the reference signal sending and receiving method in this embodiment of this application, control information and downlink data are sent by using a same resource set, which can improve resource utilization efficiency and further improve communication efficiency.

Figure 10:
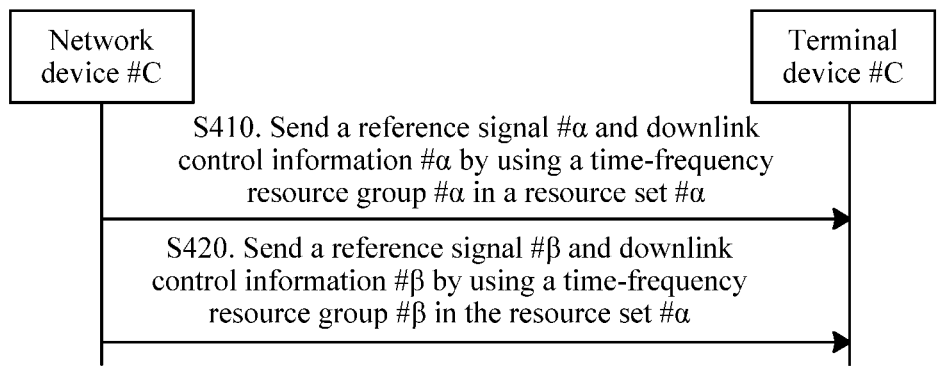
FIG. 10 is a schematic interaction diagram of still another example of a reference signal transmission process according to an embodiment of this application.

In the following, with reference to FIG. 10, a process of transmitting a reference signal #α (which is an example of a first demodulation reference signal) between a network device # C (which is another example of a network device) and a terminal device # C (which is another example of a terminal device) is used as an example to describe in detail a reference signal sending and receiving method 400 in the embodiments of this application. FIG. 10 is a schematic interaction diagram of the reference signal sending and receiving method 400 according to an embodiment of this application. There may be at least two types of reference signals in a communications system (for example, the communications system 100) applicable to the method 400.

By way of example, and not limitation, in this embodiment of this application, reference signals may be used for channel sounding, and are further used for demodulation. For example, the reference signals in this embodiment of this application may include a DMRS.

The at least two types of reference signals include a reference signal (namely, a reference signal #1) used to demodulate control information (in other words, a control channel). In addition, by way of example, and not limitation, the control information may include downlink control information, and the control channel may include a physical downlink control channel.

Further, the at least two types of reference signals include a reference signal (namely, a reference signal #2) used to demodulate data (in other words, a data channel). In addition, by way of example, and not limitation, the data may include downlink data, and the data channel may include a physical downlink data channel.

In this embodiment of this application, configuration information of the reference signal #1 and configuration information of the reference signal #2 are different.

In this embodiment of this application, the reference signal #1 may have one type of configuration information, and the reference signal #1 may have one type of configuration information.

In addition, except that each type of reference signal corresponds to only one type of configuration information, a definition and a related description of the configuration information of the reference signal in the method 400 may be similar to the description about "configuration information" in the foregoing method 200. For example, parameters included in the configuration information in the method 400 may be similar to the parameters included in the configuration information described in the method 200. To avoid repetition, detailed descriptions thereof are omitted herein.

Herein, that configuration information of the reference signal #1 and configuration information of the reference signal #2 are different may mean that the configuration information of the reference signal #1 is different from the configuration information of the reference signal #2 in terms of at least one type of parameter.

In S410, the network device # C may send a reference signal #α to the terminal device # C by using a resource set #α (which is an example of a first resource set), and the network device # C may send, to the terminal device # C, downlink control information #α (which is an example of first downlink control information) that needs to be demodulated by using the reference signal #α. A structure and a determining method of the resource set #α may be similar to the structure and the determining method of the resource set #1 in the foregoing method 200. To avoid repetition, detailed descriptions thereof are omitted herein.

Optionally, in this embodiment of this application, the reference signal #α and the downlink control information #α may be sent by using one or more time-frequency resource groups #α. In addition, when the time-frequency resource groups #α are some time-frequency resource groups in the resource set #α, without loss of generality, it is assumed that one or more time-frequency resource groups other than the time-frequency resource group #α in the resource set #α are time-frequency resource groups #β (which are examples of second time-frequency resource groups), and the network device # C may further send downlink data #β and a reference signal #β (which is an example of a second demodulation reference signal) to the terminal device # C by using the time-frequency resource groups #β. The downlink data #β is demodulated based on the reference signal #β.

Configuration information of the reference signal #β may be the same as configuration information of the reference signal #α.

Alternatively, configuration information of the reference signal #β may be different from configuration information of the reference signal #α.

Herein, except that both the reference signal #α and the reference signal #β may correspond to only one type of configuration information, a relationship between the reference signal #α and the reference signal #β may be similar to the relationship between the reference signal # $A_4$ and the reference signal # $A_1$ described in the foregoing method 200. To avoid repetition, detailed descriptions thereof are omitted herein.

In the method 400, except that the network device does not need to determine configuration information and deliver first indication information of the configuration information to the terminal device, other processes may be similar to the processes described in the foregoing method 200. To avoid repetition, detailed descriptions thereof are omitted herein.

According to the reference signal sending and receiving method in this embodiment of this application, control information and downlink data are sent by using a same resource set, which can improve resource utilization efficiency and further improve communication efficiency.

Figure 11:
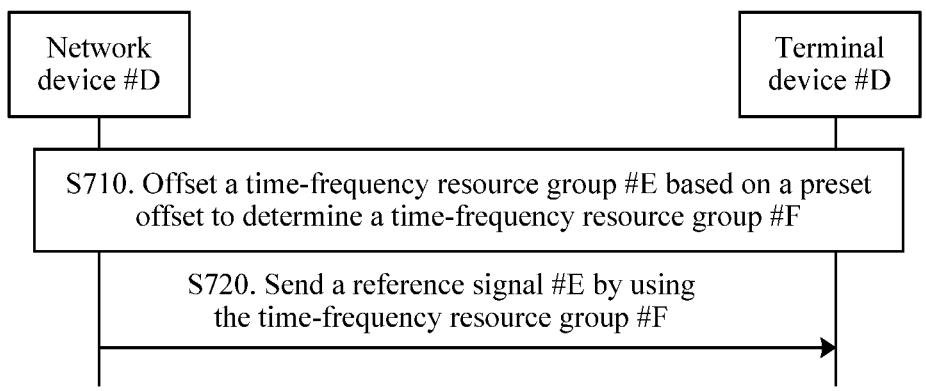
FIG. 11 is a schematic interaction diagram of yet another example of a reference signal transmission process according to an embodiment of this application.

In the following, with reference to FIG. 11, a process of transmitting a reference signal # D (which is an example of a first demodulation reference signal) and downlink information # E between a network device # D (which is another example of a network device) and a terminal device # D (which is another example of a terminal device) is used as an example to describe in detail a reference signal sending and receiving method 700 in the embodiments of this application. FIG. 11 is a schematic interaction diagram of the reference signal sending and receiving method 700 according to an embodiment of this application. There may be at least two types of reference signals in a communications system (for example, the communications system 100) applicable to the method 700.

By way of example, and not limitation, in this embodiment of this application, reference signals may be used for channel sounding, and are further used for demodulation. For example, the reference signals in this embodiment of this application may include a DMRS.

The at least two types of reference signals include a reference signal (namely, a reference signal #1) used to demodulate control information (in other words, a control channel). In addition, by way of example, and not limitation, the control information may include downlink control information, and the control channel may include a physical downlink control channel.

Further, the at least two types of reference signals include a reference signal (namely, a reference signal #2) used to demodulate data (in other words, a data channel). In addition, by way of example, and not limitation, the data may include downlink data, and the data channel may include a physical downlink data channel.

In this embodiment of this application, configuration information of the reference signal #1 and configuration information of the reference signal #2 are different.

In this embodiment of this application, the reference signal #1 may have one type of configuration information, and the reference signal #1 may have one type of configuration information.

In addition, except that each type of reference signal corresponds to only one type of configuration information, a definition and a related description of the configuration information of the reference signal in the method 700 may be similar to the description about "configuration information" in the foregoing method 200. For example, parameters included in the configuration information in the method 700 may be similar to the parameters included in the configuration information described in the method 200. To avoid repetition, detailed descriptions thereof are omitted herein.

Herein, that configuration information of the reference signal #1 and configuration information of the reference signal #2 are different may mean that the configuration information of the reference signal #1 is different from the configuration information of the reference signal #2 in terms of at least one type of parameter.

Correspondingly, in this embodiment of this application, the downlink information # E may be downlink control information or downlink data.

In S710, the network device # D may determine a resource set # D.

The resource set # D may include a time-frequency resource group # D and a time-frequency resource group # E, where the time-frequency resource group # D is reserved resources, the time-frequency resource group # E is a time-frequency resource that is in the resource set # D determined based on a preconfigured configuration pattern and that is used to carry a reference signal # E, and the reference signal # E is used to demodulate the downlink information # E.

The reserved time-frequency resources may be time-frequency resources that are determined by the terminal device as resources that do not carry reference signals.

Optionally, in this embodiment of this application, the network device # D may send indication information Y to the terminal device # D, where the indication information Y indicates that time-frequency resources in the time-frequency resource group # D are reserved time-frequency resources.

Therefore, the terminal device may determine, based on the indication information Y, that the time-frequency resources in the time-frequency resource group # D are reserved time-frequency resources, so as to determine whether the time-frequency resource group # D and the time-frequency resource group # E overlap.

A structure and a determining method of the resource set # D may be similar to the structure and the determining method of the resource set #1 in the foregoing method 200. To avoid repetition, detailed descriptions thereof are omitted herein.

Because the time-frequency resource group # D is a reserved resource, an intersection set of the time-frequency resource group # D and the time-frequency resource group # E is preferably empty.

However, because a configuration pattern of a reference signal is specified in advance, there is a case in which the time-frequency resource group # E and the time-frequency resource group # D in the resource set # D overlap.

In this case, the network device # D may offset a time-frequency resource in the time-frequency resource group # E based on a preset offset.

In S720, the network device # D may send the reference signal # E on a time-frequency resource obtained after the offsetting (denoted as a time-frequency resource group # F for ease of understanding and differentiation below).

The offset may include an offset (for example, one or more symbols) in time domain. In this case, the "offsetting a time-frequency resource in the time-frequency resource group # E" may include offsetting the time-frequency resource in time domain backwards by the offset (one or more symbols), in other words, a time-frequency resource corresponding to an interval between the time-frequency resource and the time-frequency resource that corresponds to the offset in time domain may be used as the time-frequency resource group # F.

Alternatively, the offset may include an offset (for example, one or more REs) in frequency domain. In this case, the "offsetting a time-frequency resource in the time-frequency resource group # E" may include offsetting the time-frequency resource in frequency domain by the offset (one or more REs) in a high-frequency (or low-frequency) direction, in other words, a time-frequency resource corresponding to a spacing between the time-frequency resource and the time-frequency resource that corresponds to the offset in frequency domain may be used as the time-frequency resource group # F.

In addition, in this embodiment of this application, the "offsetting a time-frequency resource in the time-frequency resource group # E" may mean that each time-frequency resource in the time-frequency resource group # E is offset. In other words, in this case, each time-frequency resource in the time-frequency resource group # F is obtained after a time-frequency resource in the time-frequency resource group # E is offset.

Alternatively, in this embodiment of this application, the "offsetting a time-frequency resource in the time-frequency resource group # E" may mean that only time-frequency resources in the time-frequency resource group # E that overlap with the time-frequency resource group # D are offset. In other words, in this case, time-frequency resources in the time-frequency resource group # F include time-frequency resources that are in the time-frequency resource group # E and that do not overlap with the time-frequency resource group # D, and the time-frequency resources in the time-frequency resource group # F include time-frequency resources obtained after the time-frequency resources in the time-frequency resource group # E that overlap with the time-frequency resource group # D are offset.

In this embodiment of this application, the preset offset may be specified in a communications system or a communication protocol. Therefore, the network device # D and the terminal device # D may determine the offset based on the specification of the communications system or the communication protocol, and the offset determined by the network device # D and the offset determined by the terminal device # D can be consistent. Alternatively, in this embodiment of this application, the offset may be determined by the network device # D and notified to the terminal device # D.

The network device may semi-statically indicate the preset offset by using higher layer signaling (such as SIB or RRC signaling).

Alternatively, the network device may dynamically indicate the preset offset by using physical layer signaling (such as downlink control information (DCI)).

In addition, a method and a process in which the terminal device # D determines the resource set # D, a resource set # E, and the time-frequency resource group # F may be similar to processing of the network device # D. To avoid repetition, detailed descriptions thereof are omitted herein.

Figure 12:
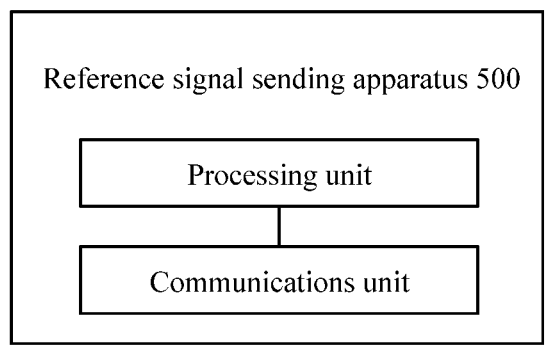
FIG. 12 is a schematic block diagram of an example of a reference signal sending apparatus according to an embodiment of this application.

FIG. 12 is a schematic block diagram of a reference signal sending apparatus 500 according to an embodiment of this application. The reference signal sending apparatus 500 may correspond to (for example, may be configured in or may be) the network device described in the method 200, 300, 400, or 700. Moreover, modules or units in the reference signal sending apparatus 500 are respectively configured to perform actions or processing processes performed by the network device in the method 200, 300, 400, or 700. To avoid repetition, detailed descriptions thereof are omitted herein.

In this embodiment of this application, the apparatus 500 may be a network device. In this case, the apparatus 500 may include a processor and a transceiver. The processor and the transceiver are communicatively connected. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, a communications unit in the apparatus 500 shown in FIG. 12 may correspond to the transceiver, and a processing unit in the apparatus 500 shown in FIG. 12 may correspond to the processor.

In this embodiment of this application, the apparatus 500 may be a chip (or a chip system) installed in a network device. In this case, the apparatus 500 may include a processor and an input/output interface. The processor may be communicatively connected to a transceiver of the network device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, a communications unit in the apparatus 500 shown in FIG. 12 may correspond to the input/output interface, and a processing unit in the apparatus 500 shown in FIG. 12 may correspond to the processor.

Figure 13:
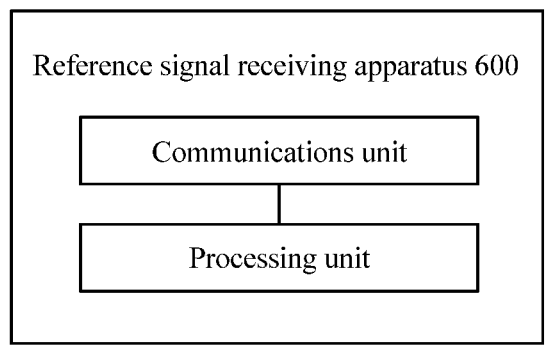
FIG. 13 is a schematic block diagram of another example of a reference signal receiving apparatus according to an embodiment of this application.

FIG. 13 is a schematic block diagram of a reference signal receiving apparatus 600 according to an embodiment of this application. The reference signal receiving apparatus 600 may correspond to (for example, may be configured to implement) the terminal device described in the method 200, 300, 400, or 700. Moreover, modules or units in the reference signal receiving apparatus 600 are respectively configured to perform actions or processing processes performed by the terminal device in the method 200, 300, 400, or 700. To avoid repetition, detailed descriptions thereof are omitted herein.

In this embodiment of this application, the apparatus 600 may be a terminal device. In this case, the apparatus 600 may include a processor and a transceiver. The processor and the transceiver are communicatively connected. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, a communications unit in the apparatus 600 shown in FIG. 13 may correspond to the transceiver, and a processing unit in the apparatus 600 shown in FIG. 13 may correspond to the processor.

In this embodiment of this application, the apparatus 600 may be a chip (or a chip system) installed in a terminal device. In this case, the apparatus 600 may include a processor and an input/output interface. The processor may be communicatively connected to a transceiver of the terminal device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, a communications unit in the apparatus 600 shown in FIG. 13 may correspond to the input/output interface, and a processing unit in the apparatus 600 shown in FIG. 13 may correspond to the processor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    determining a resource set, wherein the resource set is allocated to be used to carry a demodulation reference signal and downlink data, the demodulation reference signal is usable to demodulate the downlink data, the resource set comprises a first time-frequency resource group and a second time-frequency resource group, the first time-frequency resource group comprises reserved time-frequency resources, and the second time-frequency resource group is allocated to be used to carry the demodulation reference signal;
    in response to the first time-frequency resource group and the second time-frequency resource group overlapping, determining a third time-frequency resource group based on a location of the second time-frequency resource group and an offset, wherein the offset is determined according to a preset rule; and
    sending the demodulation reference signal using the third time-frequency resource group.

2. The method according to claim 1, wherein before determining the third time-frequency resource group based on the location of the second time-frequency resource group and the offset, the method further comprises:
    sending indication information to a terminal device, wherein the indication information indicates that the first time-frequency resource group is reserved time-frequency resources.

3. The method according to claim 1, wherein in response to the first time-frequency resource group and the second time-frequency resource group overlapping, determining the third time-frequency resource group based on the location of the second time-frequency resource group and the offset comprises:
    in response to the first time-frequency resource group comprising at least one same resource element (RE) as the second time-frequency resource group, determining the third time-frequency resource group based on the location of the second time-frequency resource group and the offset.

4. The method according to claim 1, wherein the offset comprises N time units, N is a positive integer, and N is preset, or N is determined and notified by a network device to a terminal device.

5. The method according to claim 1, wherein determining the third time-frequency resource group based on the location of the second time-frequency resource group and the offset comprises:
    determining the third time-frequency resource group, wherein each resource element (RE) in the third time-frequency resource group is obtained by offsetting an RE in the second time-frequency resource group with the offset.

6. The method according to claim 1, wherein the first time-frequency resource group and the third time-frequency resource group occupy different symbols in time domain.

7. A method, comprising:
    determining a resource set, wherein the resource set is allocated to be used to carry a demodulation reference signal and downlink data, the demodulation reference signal is usable to demodulate the downlink data, the resource set comprises a first time-frequency resource group and a second time-frequency resource group, the first time-frequency resource group comprises reserved time-frequency resources, and the second time-frequency resource group is allocated to be used to carry the demodulation reference signal;
    in response to the first time-frequency resource group and the second time-frequency resource group overlapping, determining a third time-frequency resource group based on a location of the second time-frequency resource group and an offset, wherein the offset is determined according to a preset rule; and
    receiving the demodulation reference signal using the third time-frequency resource group.

8. The method according to claim 7, wherein before determining the third time-frequency resource group based on the location of the second time-frequency resource group and the offset, the method further comprises:
    receiving indication information sent by a network device, wherein the indication information indicates that the first time-frequency resource group comprises reserved time-frequency resources.

9. The method according to claim 7, wherein in response to the first time-frequency resource group and the second time-frequency resource group overlapping, determining the third time-frequency resource group based on the location of the second time-frequency resource group and the offset comprises:
    in response to the first time-frequency resource group comprising at least one same resource element (RE) as the second time-frequency resource group, determining the third time-frequency resource group based on the location of the second time-frequency resource group and the offset.

10. The method according to claim 7, wherein the offset comprises N time units, N is a positive integer, and N is preset, or N is determined and notified by a network device to a terminal device.

11. The method according to claim 7, wherein determining the third time-frequency resource group based on the location of the second time-frequency resource group and the offset comprises:
    determining the third time-frequency resource group, wherein each resource element (RE) in the third time-frequency resource group is obtained by offsetting an RE in the second time-frequency resource group with the offset.

12. The method according to claim 7, wherein the first time-frequency resource group and the third time-frequency resource group occupy different symbols in time domain.

13. An apparatus, comprising:
    at least one processor; and
    a non-transitory memory storing instructions that are executable by the at least one processor, wherein the instructions, when executed by the at least one processor, instruct the at least one processor to:
        determine a resource set, wherein the resource set is allocated to be used to carry a demodulation reference signal and downlink data, the demodulation reference signal is usable to demodulate the downlink data, the resource set comprises a first time-frequency resource group and a second time-frequency resource group, the first time-frequency resource group comprises reserved time-frequency resources, and the second time-frequency resource group is allocated to be used to carry the demodulation reference signal;

in response to the first time-frequency resource group and the second time-frequency resource group overlapping, determine a third time-frequency resource group based on a location of the second time-frequency resource group and an offset, wherein the offset is determined according to a preset rule; and send the demodulation reference signal using the third time-frequency resource group.

14. The apparatus according to claim 13, wherein the instructions further instruct the at least one processor to:
send indication information to a terminal device, wherein the indication information indicates that the first time-frequency resource group is reserved time-frequency resources.

15. The apparatus according to claim 13, wherein the instructions further instruct the at least one processor to:
in response to the first time-frequency resource group comprising at least one same resource element (RE) as the second time-frequency resource group, determine the third time-frequency resource group based on the location of the second time-frequency resource group and the offset.

16. The apparatus according to claim 13, wherein the offset comprises N time units, N is a positive integer, and N is preset, or N is determined and notified by a network device to a terminal device.

17. The apparatus according to claim 13, wherein the instructions further instruct the at least one processor to:
determine the third time-frequency resource group, wherein each resource element (RE) in the third time-frequency resource group is obtained by offsetting an RE in the second time-frequency resource group with the offset.

18. The apparatus according to claim 13, wherein the first time-frequency resource group and the third time-frequency resource group occupy different symbols in time domain.

19. The apparatus according to claim 13, wherein the apparatus is a network device, and the demodulation reference signal is sent to a terminal device using the third time-frequency resource group.

* * * * *